United States Patent [19]
Loo et al.

[11] Patent Number: 5,845,325
[45] Date of Patent: Dec. 1, 1998

[54] VIRTUAL ADDRESS WRITE BACK CACHE WITH ADDRESS REASSIGNMENT AND CACHE BLOCK FLUSH

[75] Inventors: William Van Loo, Palo Alto; John Watkins, Sunnyvale; Robert Garner, San Jose; William Joy, Palo Alto; Joseph Moran, Santa Clara; William Shannon, Los Altos; Ray Cheng, Cupertino, all of Calif.

[73] Assignee: Sun Microsystems, Inc., Mountain View, Calif.

[21] Appl. No.: 46,476

[22] Filed: Apr. 13, 1993

Related U.S. Application Data

[63] Continuation of Ser. No. 603,248, Oct. 24, 1990, abandoned, which is a continuation of Ser. No. 104,280, Oct. 2, 1987, abandoned.

[51] Int. Cl.⁶ .............................. G06F 15/16; G06F 12/08
[52] U.S. Cl. ............................................ 711/135; 395/678
[58] Field of Search ........................ 364/DIG. 1, DIG. 2; 395/400, 425, 600, 678; 711/135, 141–146, 203, 209; 707/8, 201

[56] References Cited

U.S. PATENT DOCUMENTS

| | | |
|---|---|---|
| B 452,138 | 3/1976 | Nagashima . |
| 4,426,682 | 1/1984 | Riffe et al. ............................... 364/200 |
| 4,654,819 | 3/1987 | Stiffler et al. ............................ 364/900 |
| 4,677,546 | 6/1987 | Freeman et al. ......................... 364/200 |
| 4,700,330 | 10/1987 | Altman et al. ........................... 365/222 |
| 4,713,755 | 12/1987 | Worley, Jr. et al. ..................... 364/200 |
| 4,783,736 | 11/1988 | Ziegler et al. ........................... 364/200 |
| 4,794,521 | 12/1988 | Ziegler et al. ........................... 364/200 |
| 4,819,154 | 4/1989 | Stiffler et al. ........................... 364/200 |
| 5,010,475 | 4/1991 | Hazawa .................................... 364/200 |

FOREIGN PATENT DOCUMENTS 62-202247  9/1987  Japan .

OTHER PUBLICATIONS

Computer Design, vol. 26, No. 14, Aug. 1987, Littleton, Massachusetts, U.S., pp. 89–94, Author: W. Van Loo, Title: 'Maximize Performance by Choosing Best Memory', *the entire document*.

Electronique Industrielle, No. 6, Oct. 1986, Paris, France pp. 27–28, Author: C. Gay, Title: 'Les Concepts de Memoire Virtuelle' *p. 35, col. 3, line 12—p. 37, col. 2, line 21; FIGS. 10,11*.

Primary Examiner—Maria N. Von Buhr
Attorney, Agent, or Firm—Blakely Sokoloff Taylor & Zafman

[57] ABSTRACT

Hardware and software improvements in workstations which utilize virtual addressing in multi-user operating systems with write back caches, including operating systems which allow each user to have multiple active processes. In virtual addressing, multi-user workstations, system performance may be improved significantly by including a virtual address write back cache as one of the system elements. Data protection and the reassignment of virtual addresses are supported within such a system as well. Multiple active processes, each with its own virtual address space, and an operating system shared by those processes in a manner which is invisible to user programs. Cache "Flush" logic is used to remove selected blocks from the virtual cache when virtual addresses are to be reassigned.

11 Claims, 23 Drawing Sheets

Note: All Control Signals are Negative Active Signals

VIRTUAL ADDRESS WRITE BACK CACHE WITH ADDRESS REASSIGNMENT AND CACHE BLOCK FLUSH

This is a continuation of application Ser. No. 07/603,248, filed Oct. 24, 1990 now abandoned, which is a continuation of application Ser. No. 07/104,280 filed Oct. 2, 1987 now abandoned.

SUMMARY OF THE INVENTION

This invention is directed to certain hardware and software improvements in workstations which utilize virtual addressing in multi-user operating systems with write back caches, including operating systems which allow each user to have multiple active processes. In this connection, for convenience the invention will be described with reference to a particular multi-user, multiple active processes operating system, namely the Unix operating system. However, the invention is not limited to use in connection with the Unix operating system, nor are the claims to be interpreted as covering an invention which may be used only with the Unix operating system.

In a Unix based workstation, system performance may be improved significantly by including a virtual address write back cache as one of the system elements. The present invention describes an efficient scheme for supporting data protection and the reassignment of virtual addresses within such a system. The invention features support for multiple active processes, each with its own virtual address space, and an operating system shared by those processes in a manner which is invisible to user programs.

Cache "Flush" logic is used to remove selected blocks from the virtual cache when virtual addresses are to be reassigned. If a range of addresses (a virtual page address, for example) is to be reassigned, then all instances of addresses from within this range must be removed, or "flushed", from the cache before the new address assignment can be made. A cache block is "flushed" by invalidating the valid bit in its tags and writing the block back to memory, if the block has been modified. The "Flush" logic includes logic to identify "Flush" commands within "Control Space"; logic to match particular virtual address fields, within a Flush command, to corresponding virtual address fields either within the cache's block address space or its tag virtual address field; and (optional) logic to flush multiple cache block addresses as a result of a single "Flush" command issued by the CPU (or DVMA device, if allowed). It also includes logic to invalidate the cache valid tag on matching cache blocks and logic to enable modified matching blocks to be written back to memory.

The present invention includes both hardware and specific "Flush" commands inserted within the operating system kernel.

DETAILED DESCRIPTION OF THE INVENTION

Figure 1:
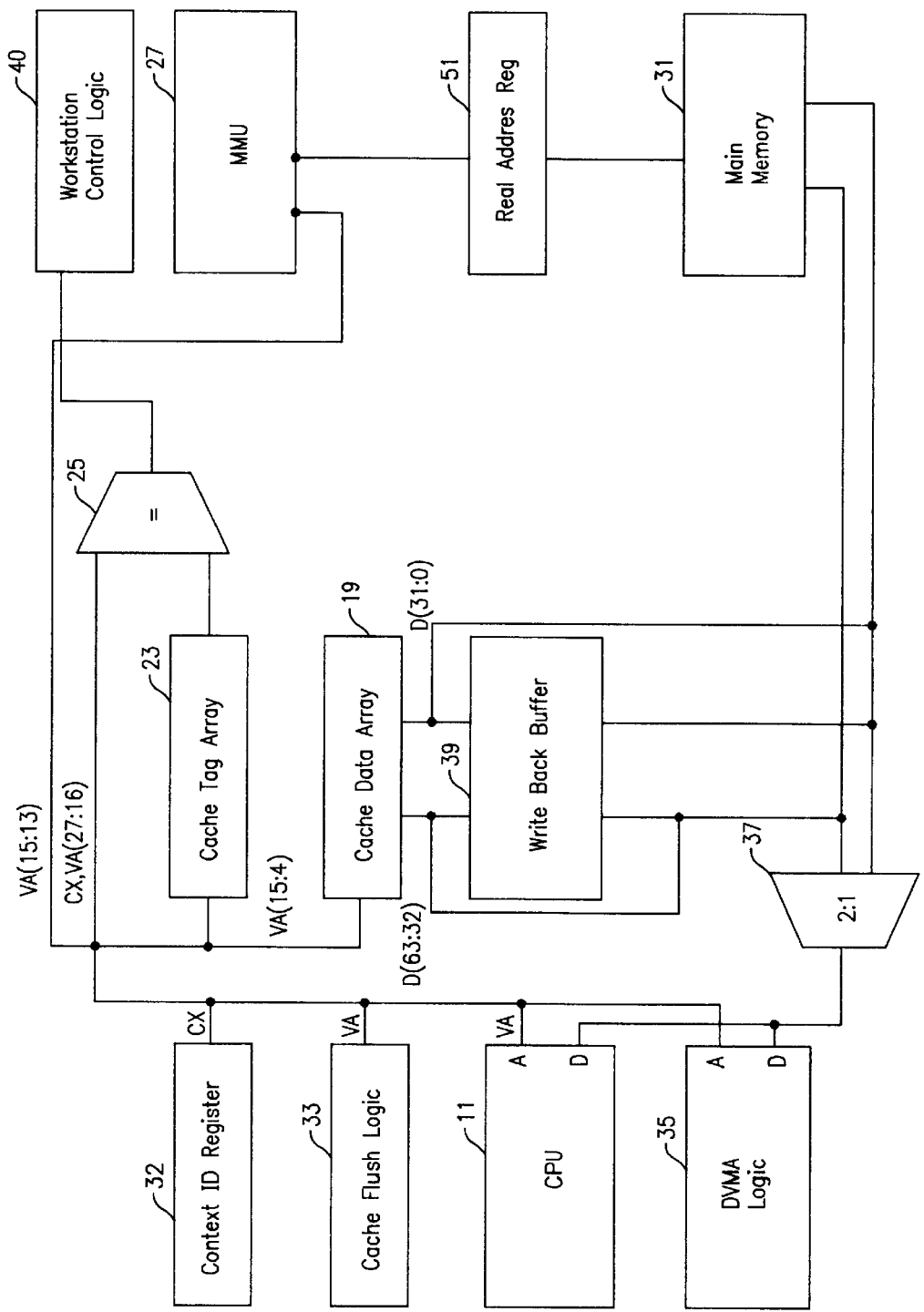
FIG. 1 is a block diagram showing the main components of a workstation utilizing virtual addresses with write back cache.

FIG. 1 shows the functional blocks in a typical workstation using virtual addresses in which the present invention is implemented.

Specifically, such a workstation includes a microprocessor or central processing unit (CPU) 11, cache data array 19, cache tag array 23, cache hit comparator 25, memory management unit (MMU) 27, main memory 31, write back buffer 39 and workstation control logic 40. Such workstations may, optionally, also include context ID register 32, cache flush logic 33, direct virtual memory access (DVMA) logic 35, and multiplexor 37.

In the present invention, various changes are made to cache flush logic 33, cache hit comparator 25 and workstation control logic 40 which improve the performance of a virtual address write back cache.

DESCRIPTION OF NECESSARY ELEMENTS OF WORKSTATION

CPU 11 issues bus cycles to address instructions and data in memory (following address translation) and possibly other system devices. The CPU address itself is a virtual address of (A) bits in size which uniquely identifies bytes of instructions or data within a virtual context. The bus cycle may be characterized by one or more control fields to uniquely identify the bus cycle. In particular, a Read/Write indicator is required, as well as a "Type" field. This field identifies the memory instruction and data address space as well as the access priority (i.e., "Supervisor" or "User" access priority) for the bus cycle. A CPU which may be utilized in a workstation having virtual addressing and capable of supporting a multi-user operating system is a MC68020.

Another necessary element in a virtual address workstation with write back cache shown in FIG. 1 is virtual address cache data array 19, which is organized as an array of $2^N$ blocks of data, each of which contains $2^M$ bytes. The $2^M$ bytes within each block are uniquely identified with the low order M address bits. Each of the $2^N$ blocks is uniquely addressed as an array element by the next lowest N address bits. As a virtual address cache, the (N+M) bits addressing bytes within the cache are from the virtual address space of (A+C) bits. (The (C) bits are context bits from optional context ID register 32 described below.) The (N+M) bits include, in general, the (P) untranslated page bits plus added virtual bits from the (A+C-P) bits defining the virtual page address.

Virtual address cache data array 19 described herein is a "direct mapped" cache, or "one way set associative" cache. While this cache organization is used to illustrate the invention, it is not meant to restrict the scope of the invention which may also be used in connection with multi-way set associative caches.

Figure 3:
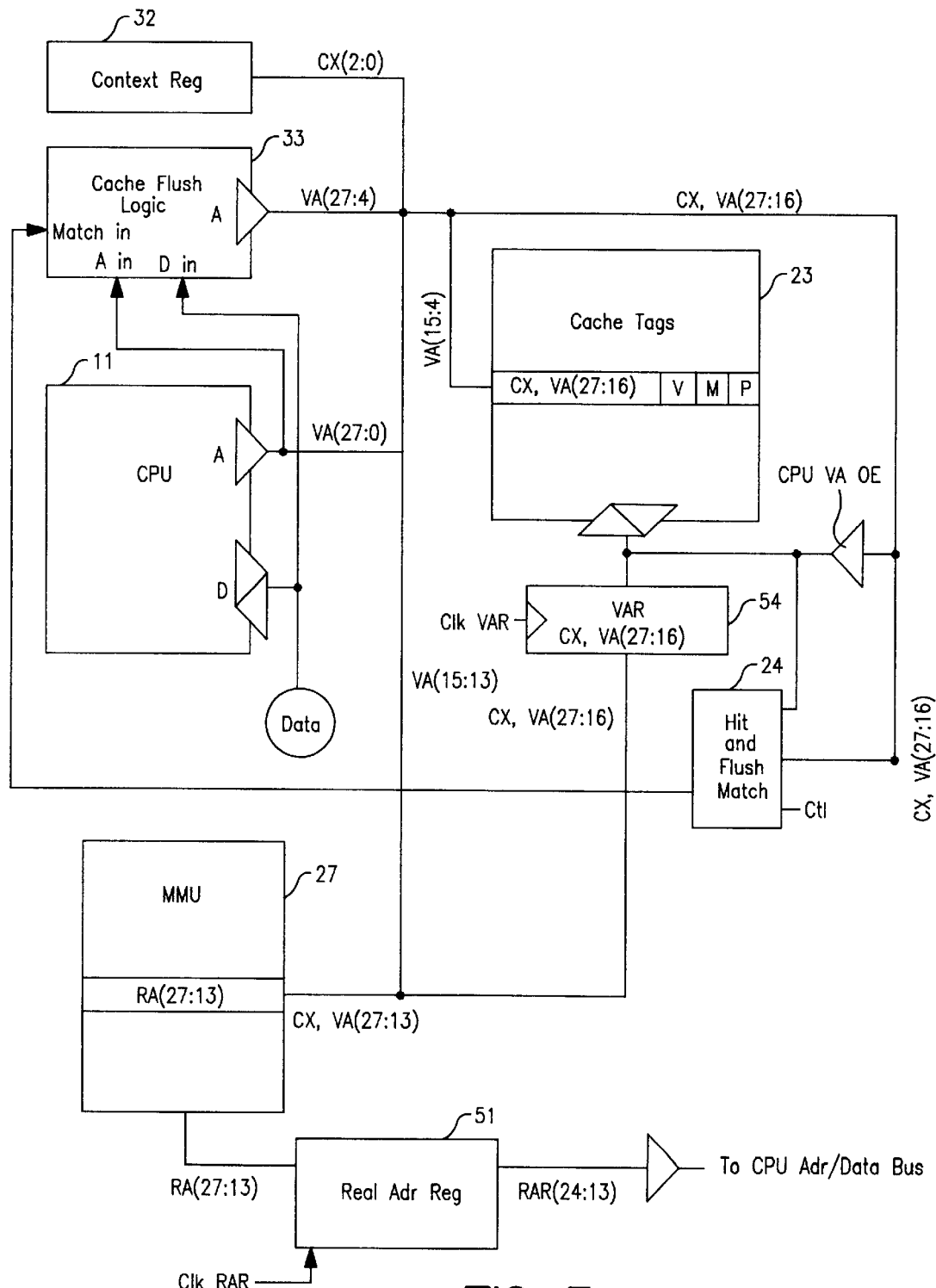
FIG. 3 is a detailed block diagram showing the address path utilized by the virtual address cache of the present invention.

Another required element shown in FIG. 1 is virtual address cache tag array 23 which has one tag array element for each block of data in cache data array 19. The tag array thus contains $2^N$ elements, each of which has a Valid bit (V), a Modified bit (M), two protection bits (P) consisting of a Supervisor Protect bit (Supvsr Prot) and a Write Allowed bit, and a virtual address field (VA, and optionally CX) as shown in FIG. 3. The contents of the virtual address field, together with low order address bits used to address the cache tag and data arrays, uniquely identify the cache block within the total virtual address space of (A+C) bits. That is, the tag virtual address field must contain ((A+C)−(M+N)) virtual address bits.

Cache "Hit" logic 25 compares virtual access addresses with the contents of the virtual address cache tag address field. Within the access address, the lowest order M bits address bytes within a block; the next lowest N bits address a block within the cache; and the remaining ((A+C)−(M+N)) bits compare with the tag virtual address field, as part of the cache "hit" logic.

Figure 2A:
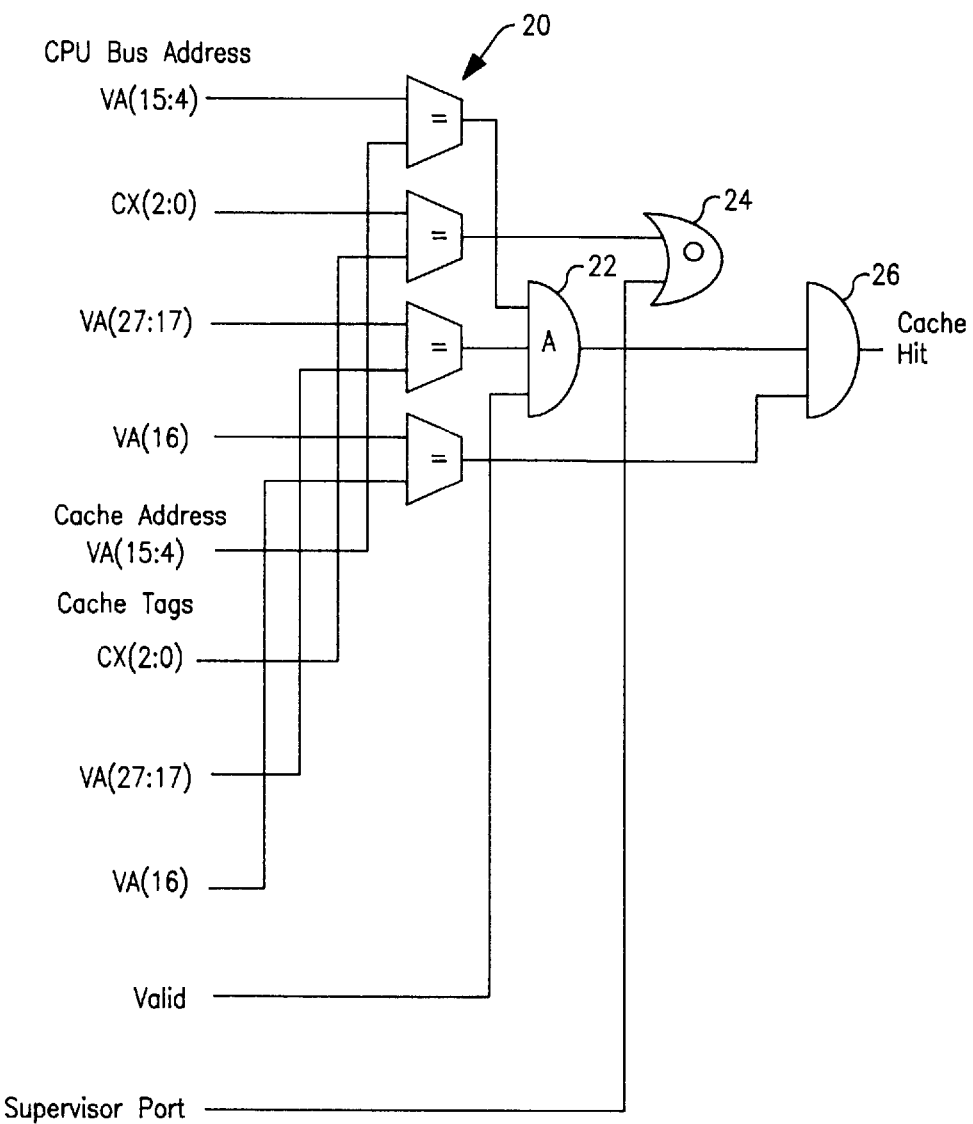
FIG. 2a is a schematic diagram of cache "hit" logic 25.

The cache "hit" logic must identify, for systems with a shared operating system, accesses to user instructions and data, and to supervisor instructions and data. A "hit" definition which satisfies these requirements is illustrated in FIG. 2a which comprises comparators 20, AND gate 22, OR gate 24 and AND gate 26.

MMU 27, which translates addresses within the virtual space into a physical address, is another required element. MMU 27 is organized on the basis of pages of size ($2^P$) bytes, which in turn are grouped as segments of size ($2^S$) pages. Addressing within a page requires (P) bits. These (P) bits are physical address bits which require no translation. The role of MMU 27 is to translate the virtual page address bits ((A+C-P) or (A-P)) into physical page addresses of (MM) bits. The composite physical address is then (MM) page address bits with (P) bits per page.

MMU 27 is also the locus for protection checking, i.e., comparing the access bus cycle priority with the protection assigned to the page. To illustrate this point, there are two types of protection that may be assigned to a page namely, a Supervisor/User access designator and a Write Protect/Write Allowed designator. Although the subject invention is not limited to such types of protection, given this page protection, a "Protection Violation" can result if either a "User" priority bus cycle accesses a page with "Supervisor" protection; or if a "Write" bus cycle accesses a page with a "Write Protect" designation.

Figure 2B:
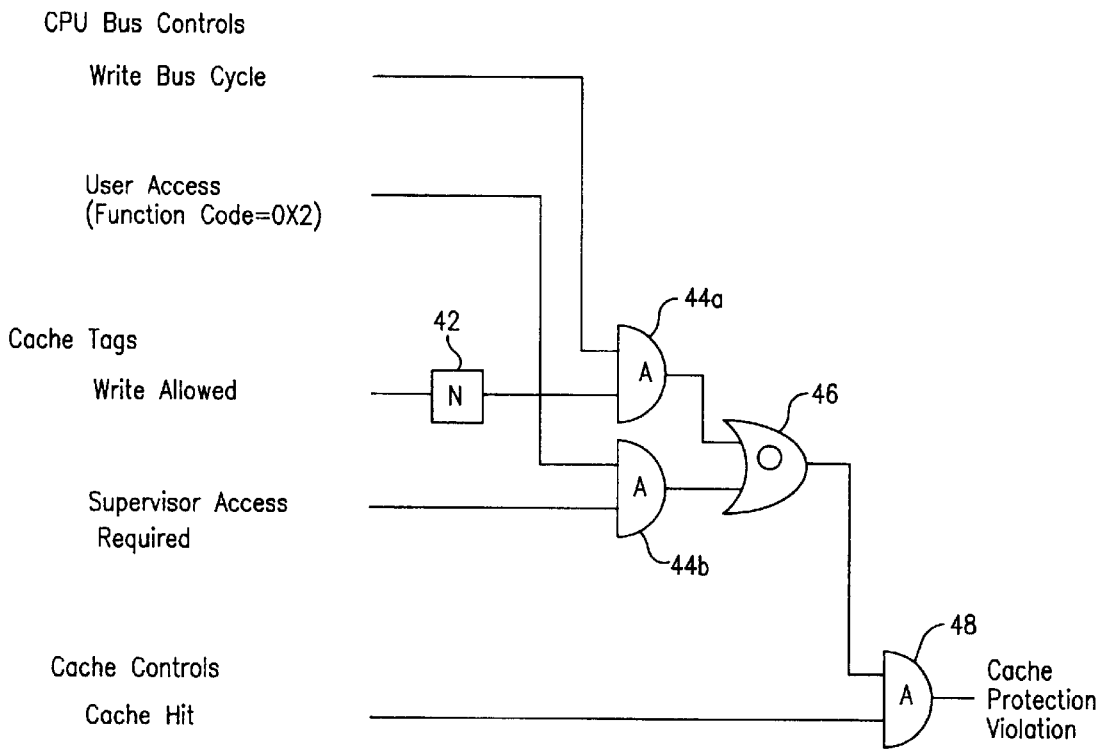
FIG. 2b is a schematic diagram of a circuit for detecting a cache protection violation.
Figure 2C:
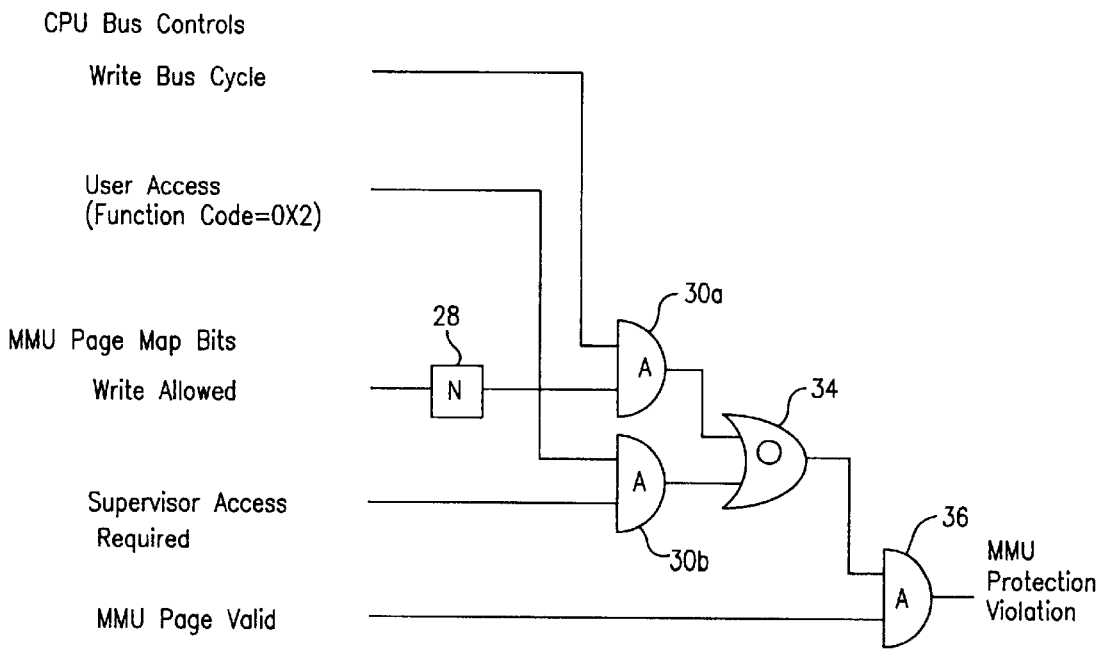
FIG. 2c is a schematic diagram of a circuit for detecting a MMU protection violation.

The application of MMU protection checking through the MMU is shown in FIG. 2c which comprises inverter 28, AND gates 30a and 30b, OR gate 34 and AND gate 36. In addition, with a virtual address write back cache, the concept of protection checking can be extended to cache only CPU cycles which do not access the MMU. Such cache only protection logic is shown in FIG. 2b comprising inverter 42, AND gates 44a and 44b, OR gate 46 and AND gate 48.

Also shown in FIG. 1 is main memory 31 which is addressable within the physical address space; control of main memory access is through workstation control logic 40.

Write back buffer 39 is a register containing one block of cache data loaded from cache data array 19. Write back buffer 39 is loaded whenever an existing cache block is to be displaced. This may be caused by a need to update the cache block with new contents, or because the block must be flushed. In either case, in a write back cache, the state of the cache tags for the existing cache block determine whether this block must be written back to memory. If the tags indicate that the block is valid and modified, as defined below, then the block contents must be written back to memory 31 when the cache block is displaced. Write back buffer 39 temporarily holds such data before it is written to memory.

Workstation control logic 40 controls the overall operation of the workstation elements shown in FIG. 1. In the preferred embodiment, control logic 40 is implemented as several state machines which are shown in FIGS. 4, 6, 7 and 13 as will be described more fully below in conjunction with the description of cache flush logic 33, portions of which are also, in the preferred embodiment, integrated into the workstation control logic.

DESCRIPTION OF OPTIONAL ELEMENTS OF WORKSTATION

Context ID register 32 is an optional external address register which contains further virtual address bits to identify a virtual context or process. This register, containing C bits, identifies a total of (2C) active user processes; the total virtual address space is of size 2(A+C).

An important component in this virtual address space of 2(A+C) bits is the address space occupied by the operating system. The operating system is common to all user processes, and so it is assigned to a common address space across all active user processes. That is, the (C) context bits have no meaning in qualifying the addresses of pages within the operating system. Rather, the operating system is assumed to lie within a common, exclusive region at the top of the (2A) bytes of virtual address space for each active context. No user pages may lie within this region. So the operating system page addresses for two distinct user processes are identical, while the user pages for the two processes are distinct. All pages within the operating system are marked as having "Supervisor" protection.

Cache flush logic 33 is also an optional element in a workstation. However, cache flush logic 33 is included, and modified as described in detail below in order to improve the performance of a virtual address, write back cache system. Briefly however, cache flush logic 33 operates as follows. If a range of addresses (a virtual page address, for example) is to be reassigned, then all instances of addresses from within this range must be removed, or "flushed", from the cache before the new address assignment can be made. A cache block is "flushed" by invalidating the valid bit in its tags and writing the block back to memory, if the block has been modified.

In addition to CPU 11 as a source of bus cycles, the workstation may include one or more external Input/Output (I/O) devices such as DVMA logic 35. These external I/O devices are capable of issuing bus cycles which parallel the CPU in accessing one or more "Types" of virtual address spaces. The virtual address from either the CPU 11 or DVMA logic 35, together with the address in context ID register 32, is referred to as the access address.

Another optional element is data bus buffer 38, which in the preferred embodiment is implemented as two buffers to control data flow between a 32 bit bus and a 64 bit bus. Such buffers are needed when the CPU data bus is 32 bits and the cache data array data bus is 64 bits.

DESCRIPTION OF ELEMENTS UNIQUE TO THE INVENTED WORKSTATION

In the present invention, the definition of a cache "Hit" is modified to take into account the use of a shared operating system across multiple active user contexts, and the access priority and page protection. By so doing, an efficient indication of a protection violation within the write back virtual address cache can be achieved. Specifically, to implement the protection definition presented above, the following cache "Hit" definition is utilized.

A cache "Hit" has three requirements:

1) The cache block must be marked as having valid contents.
2) Ignoring the (C) context bits, the access virtual address bits (A–(N+M)) must match the corresponding tag virtual address field bits (A–(N+M)), at the cache block addressed by the (N) bus access bits.
3) Either the (C) bits of the access context ID must match the corresponding (C) context bits in the cache tag virtual address field, or the cache tag Supervisor protection bit must be set active.

This definition of a cache "Hit" enables cache protection checking to be applied directly to the virtual address cache, rather than defined through an MMU check during cache miss handling. A "Protection Violation" on a cache "Hit" results:

1) if the access bus cycle has "User" priority and the cache block has "Supervisor" protection; or
2) if the access is a Write bus cycle and the cache block has Write Protection.

An implementation of cache hit detector 25 according to the present invention is shown in FIG. 2*a* described hereinabove.

The present invention utilizes a set of "Flush" commands in the Control Space to efficiently implement virtual address reassignment in a virtual address write back cache.

In general, Flush commands are bus cycles in Control Space which specify, for each unique type of Flush command, one or more virtual address fields to be compared with corresponding virtual address fields in the virtual address cache tags. "Matching" address fields cause the hardware to "flush" the cache block. To "flush" the cache block means that:

1) A matching cache block that is marked as both "Valid" and "Modified" is written back to memory. This requires a cache block "write back" bus cycle to the main memory. A "write back" bus cycle writes the contents of an entire cache block into main memory at the appropriate physical address. As a part of this cycle, the virtual address identifying the cache block is translated through the MMU into a physical memory address. During this translation, protection checking for the cache block is inhibited. The address translation through the MMU is completed prior to returning control to the processor at the conclusion of the flush command.

2) Any matching cache block that is "Valid", whether "Modified" or not, is marked as invalid.

As described, the "write back" bus cycle requires the translation of the cache block virtual address into a physical address. The concept of the flush command and "write back" bus cycle can also be extended to virtual address caches which contain both virtual address and physical address tag fields. If a physical address tag field is present, no translation is required at the time the "write back" bus cycle to main memory is performed. However, the present invention is directed to the use of virtual address tags to support a virtual address write back cache.

The flush command as described above applies to a single cache block. The application of the flush command can also be extended so that a single flush command activates hardware which checks multiple cache blocks, flushing those blocks which match the address fields of the flush command. It is only required that the address translation of the last cache block flushed be concluded prior to returning control to the processor at the conclusion of the command.

Three specific flush commands are defined below. While other similar commands may be defined, these three are particularly useful in effectively restricting the scope of a "Flush" command to a minimal address range. These "Flush" commands are also effective in implementing a multiple context, shared operating system address space.

1. Context Match Flush Command

The Context Match Flush command flushes from the cache all cache blocks within a specified context which are from User protected pages. It specifies a context identifier of (C) bits. The match criteria is to require first, that the cache tags identify the block as having User protection; and second, that the (C) bit field of the Flush command match the corresponding (C) bit Context identification field of the tags.

The Context Match Flush command is used to ensure cache addressing consistency whenever a new active context replaces an old context in the MMU. The Context Match Flush must be performed before the old context references are removed from the MMU, since the MMU is required to translate the cache blocks' virtual addresses.

2. Page Match Flush Command

The Page Match Flush command flushes from the cache all cache blocks within a specified page, regardless of the page protection. It specifies a page address of (A+C–P) bits. The match criteria is to require that first, the (A–P) bit field of the Flush command, which identifies a virtual page address within a Context, match the corresponding (A–P) bits to identify the virtual page address of a given cache block. These (A–P) bits may be in the cache tag virtual address field or in a combination of both the cache access address and the cache tag virtual address field, depending on the page size and the size of the cache.

The second match criteria is to require that one of the following two conditions is met: i) the cache block's Supervisor access protection tag is active; or ii) the context ID register of (C) bits match the cache block's corresponding Context ID tag field of (C) bits.

The Page Match Flush command is used during page management to purge all references to a virtual page—with either Supervisor or User protection—from the cache. It must be performed before the MMU is updated to remove the page, since the MMU is required to translate the cache blocks' virtual addresses.

3. Segment Match Flush Command

The Segment Match Flush command flushes from the cache all cache blocks within a specified segment, regardless of the page protection. It specifies a segment address of ((A+C)−(P+S)) bits, since the segment size is (2**S) pages. The match criteria is to require that first, the (A−(P+S)) bit field of the Flush command, which identifies a segment within a Context, match the corresponding (A−(P+S)) bits identifying a segment for a given cache block. These (A−(P+S)) bits may be in the cache tag virtual address field or in a combination of both the cache access address and the cache tag virtual address field, depending on the segment size, the page size, and the size of the cache.

The second match criteria is to require that one of the following two conditions is met: i) the cache block's Supervisor access protection tag is active; or ii) the context ID register of (C) bits match the cache block's corresponding Context ID tag field of (C) bits.

The Segment Match Flush command is used during page management to purge all references to a virtual segment— with either Supervisor or User protection—from the cache. It may be required, depending on the structure of the MMU, whenever the pages of an entire virtual segment must be reassigned to a new virtual segment. It must be performed before the MMU is updated to remove the segment mapping, since the MMU is required to translate the cache blocks' virtual addresses.

Flush Command Usage

The three "Flush" commands defined above, together with the respective "match" criteria, are executed only by the operating system within the Unix kernel. The placement of flush commands within the kernel is described within Appendix A. By proper placement of "Flush" commands within the kernel, virtual address reassignment for a Unix system may be implemented to support a virtual address write back cache.

The set of flush commands defined above, when used in the Unix kernel as shown in Appendix A, implement a mechanism to support virtual address reassignment, as required by a virtual address cache, for a Unix system with multiple active contexts and an operating system shared across those contexts for workstations having either write through or write back caches.

The flush commands, when used in the Unix kernel as shown in Appendix A, support a virtual address write back cache within a Unix system so that the use of such a cache is transparent to user application programs. No changes are required to user programs to take advantage of the memory speed improvements inherent in a virtual address write back cache.

Additionally, the flush commands, when used in a Unix kernel as shown in Appendix A, support a virtual address write back cache implementation which contains only a virtual address tag field for block identification, not a physical address tag field. Avoiding the addition of a physical address tag field minimizes the number of cache tags required for the virtual address write back cache. A write back cache requires that at some point, any cache block which has been modified must be written back into main memory. This "write back" operation may take place either when the cache block is replaced by new block contents (the normal block replacement on a cache "miss"), or when the cache block is flushed prior to reassigning a range of virtual addresses containing this cache block.

If the cache tags contain no physical address field, then the virtual address tags must be translated into a physical address before the cache block may be written into memory. In the case of cache flushes, this implies that all address translations of cache block virtual address fields which result from a flush match must be completed prior to the operating system's reassignment of the virtual address range within the MMU. Two features of the invention are in part responsible for ensuring that this requirement is met:

1) first, that the flush command requires the completion of the cache block virtual address translation before control is returned to the processor;
2) and second, that the flush commands are structured in the kernel, as shown in Appendix A, at strategic locations which guarantee the flushing of all modified cache blocks prior to the reassignment of the virtual address range.

The set of three flush commands defined above, together with their respective "match" criteria, constitute an efficient virtual address reassignment mechanism when placed in the Unix kernel as shown in Appendix A. The mechanism is efficient in that it optimizes flush performance for the virtual address write back cache for the three cases of virtual address reassignment required by the operating system:

1) whenever an existing active context is being replaced by a new context;
2) whenever MMU limitations require the reassignment of a currently mapped segment to a new segment; and
3) whenever a physical page in memory is to be reassigned to a new virtual address.

The three flush commands are defined, together with the flush match criteria, to specifically cover each of these cases. Flush commands are issued by the kernel by starting at a base block address, and then incrementing block addresses so as to check every block within a fixed address range. The flush commands as defined are efficient in address reassignment for two primary reasons:

1) The flush match criteria restrict the number of blocks flushed to be only those blocks which require flushing within the flush address range. Other extraneous addresses, outside the flush range, are checked but are not flushed.
2) For each of the three cases requiring address flushing, the defined flush commands allow the cache to be checked with a single pass through the appropriate cache block address range. For example, to flush a segment, every page within the segment must be flushed. If a segment flush were not implemented, then multiple passes of page flush commands with varying page addresses might be required to complete the segment flush.

Figure 5:
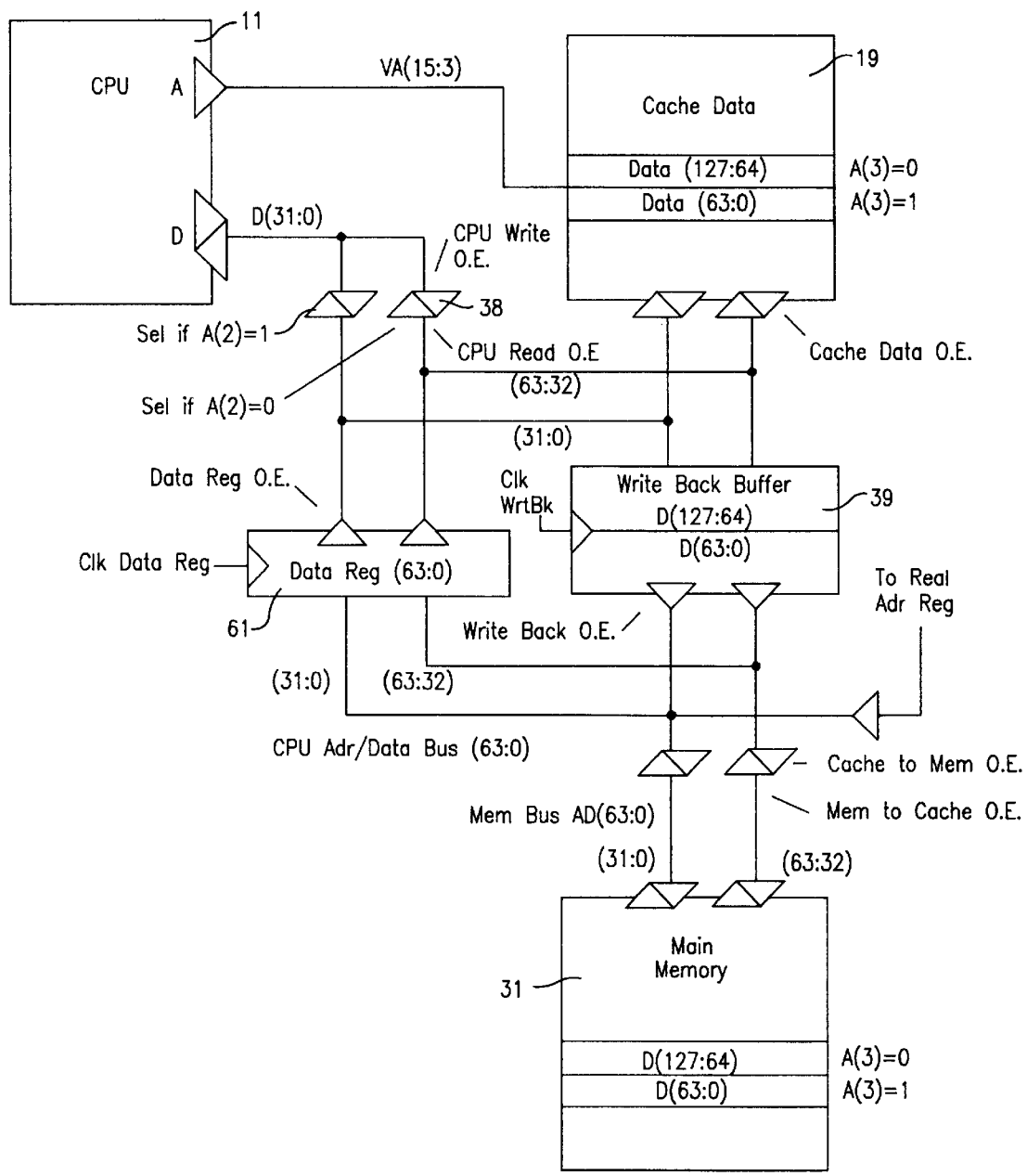
FIG. 5 is a detailed block diagram showing the data path utilized by the virtual address path of the present invention.
Figure 6A:
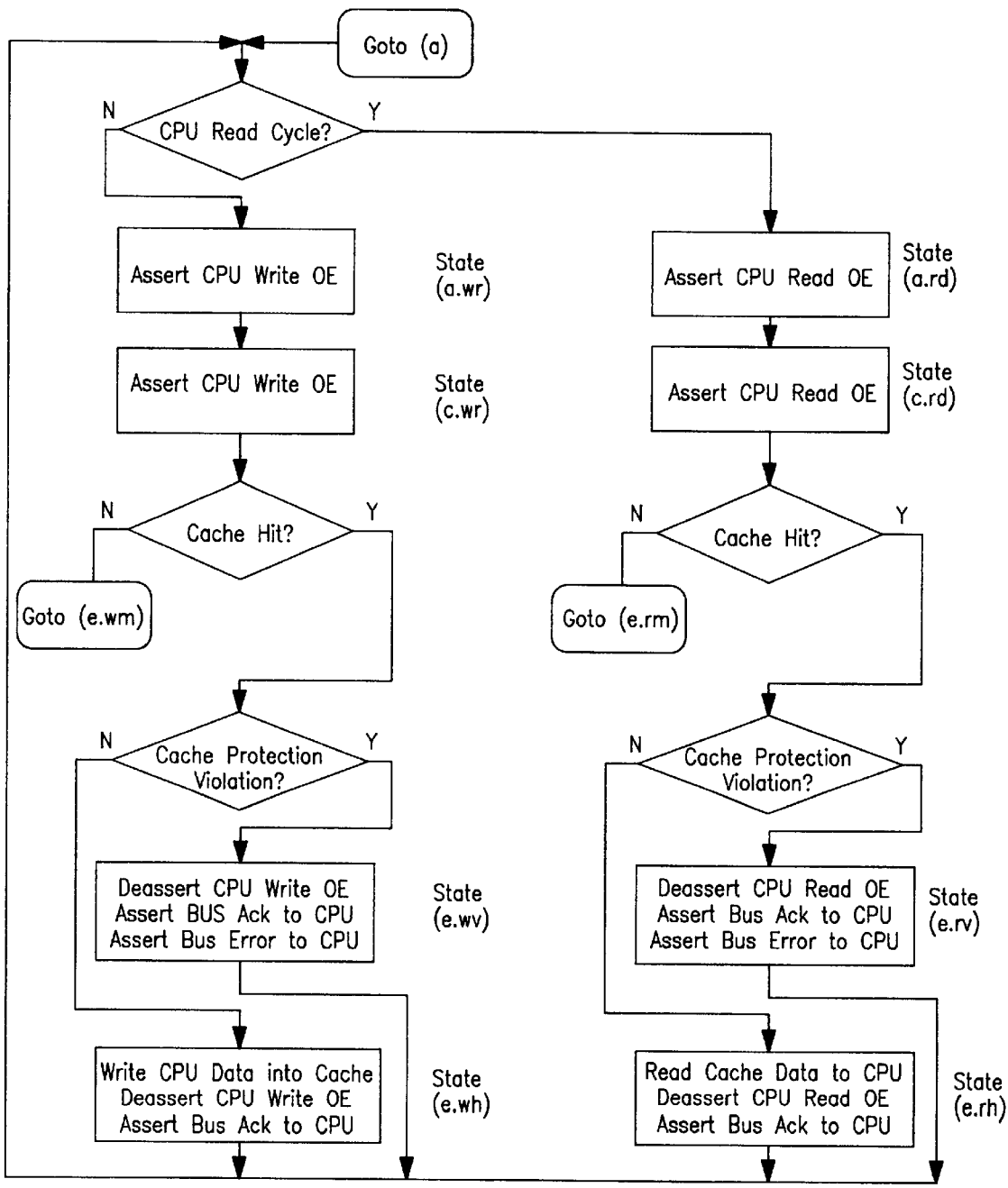
FIG. 6 (6a, 6b, 6c and 6d) is a flow diagram of a state machine implementation for certain controls related to data transfers to and from a virtual address write back cache (states (a)–(o)).
Figure 6B:
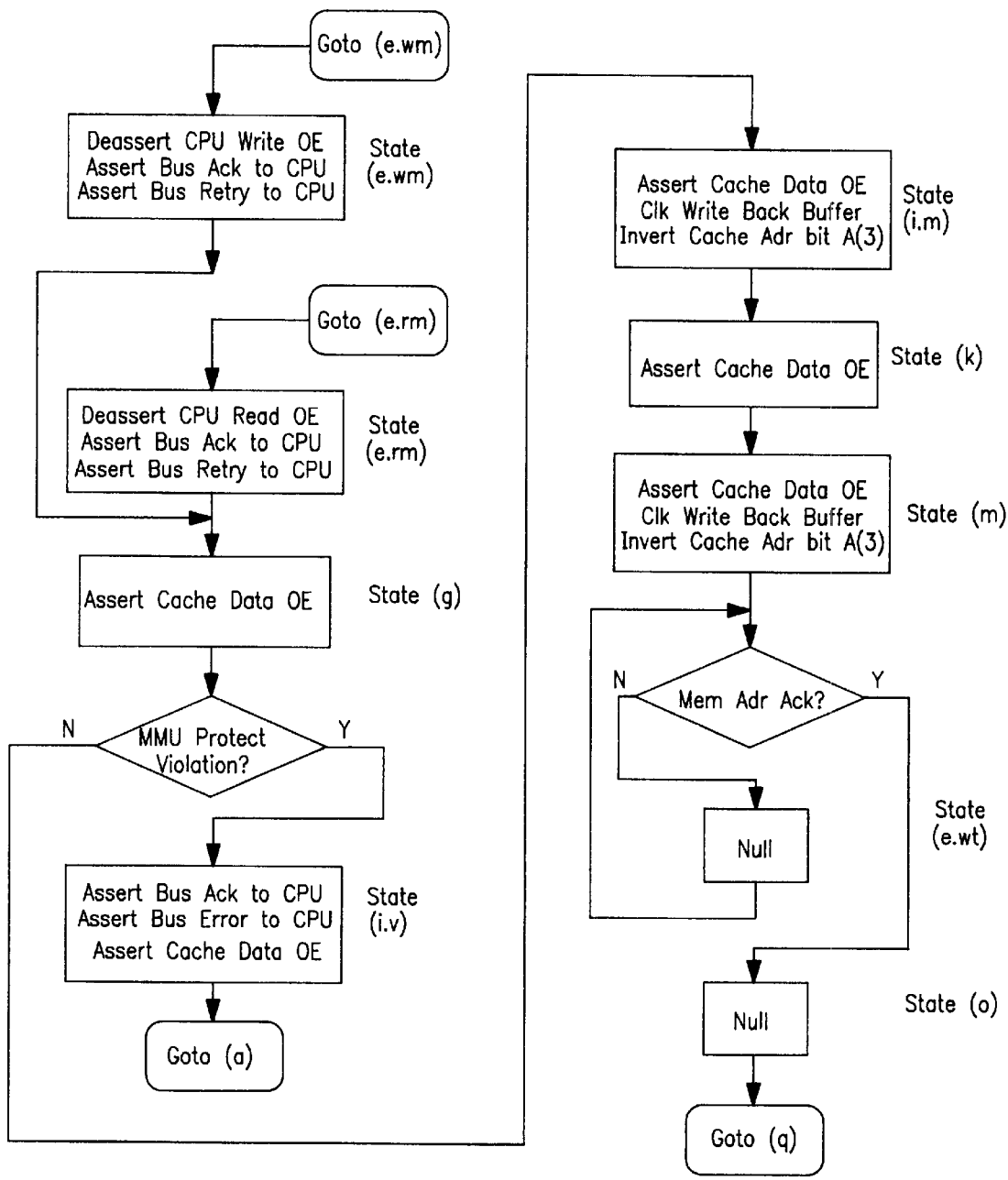
Figure 6C:
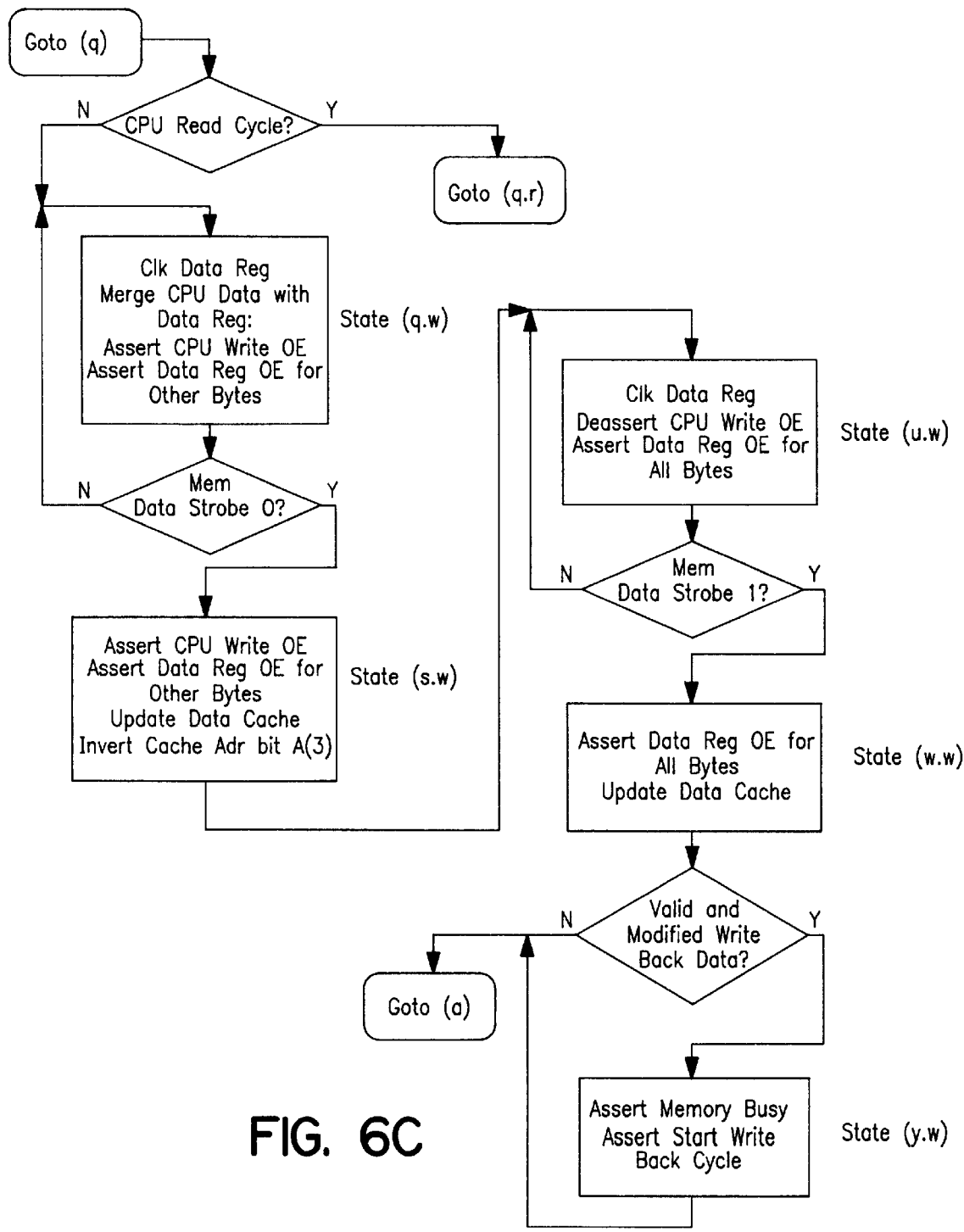
Figure 6D:
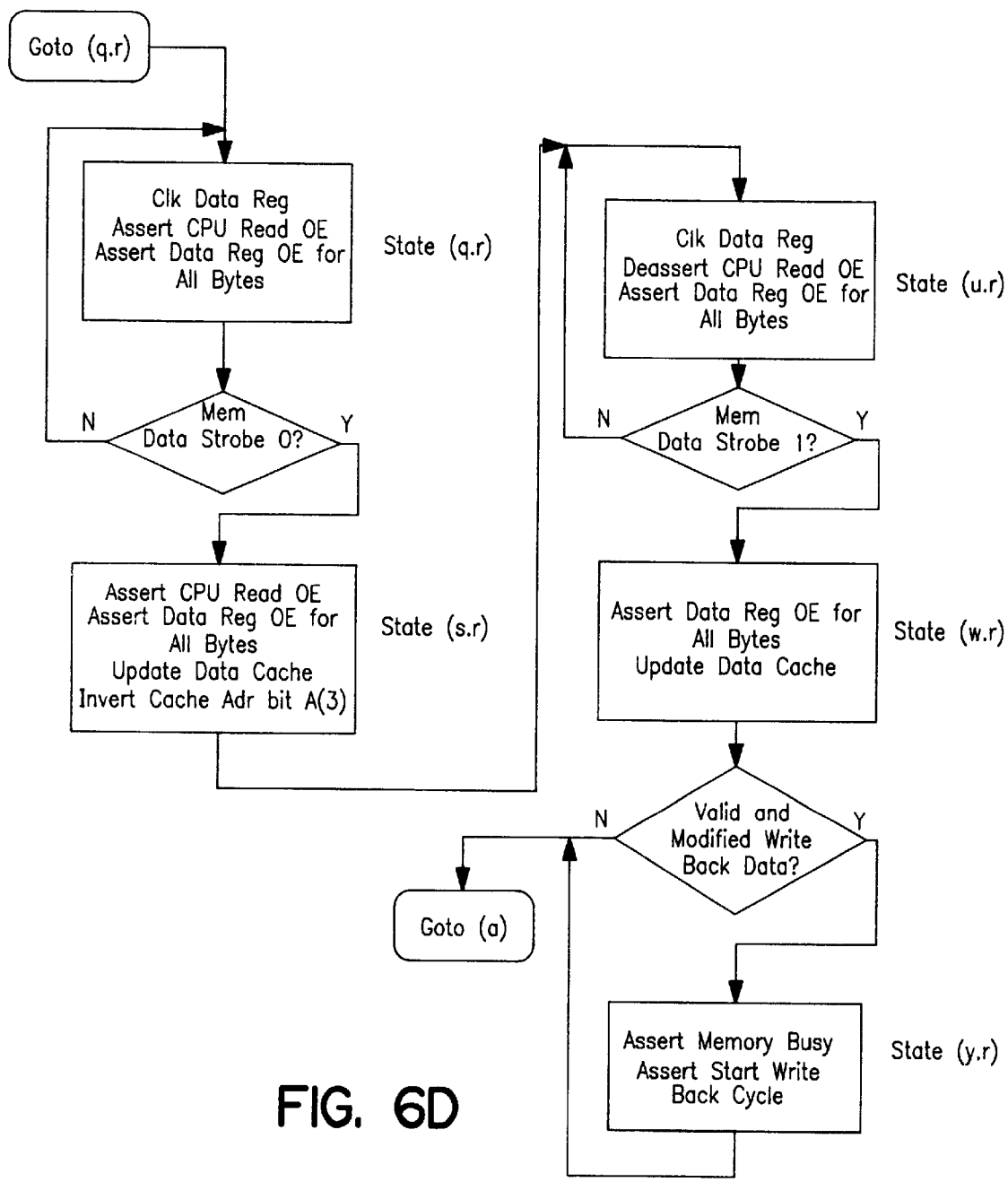
Figure 8:
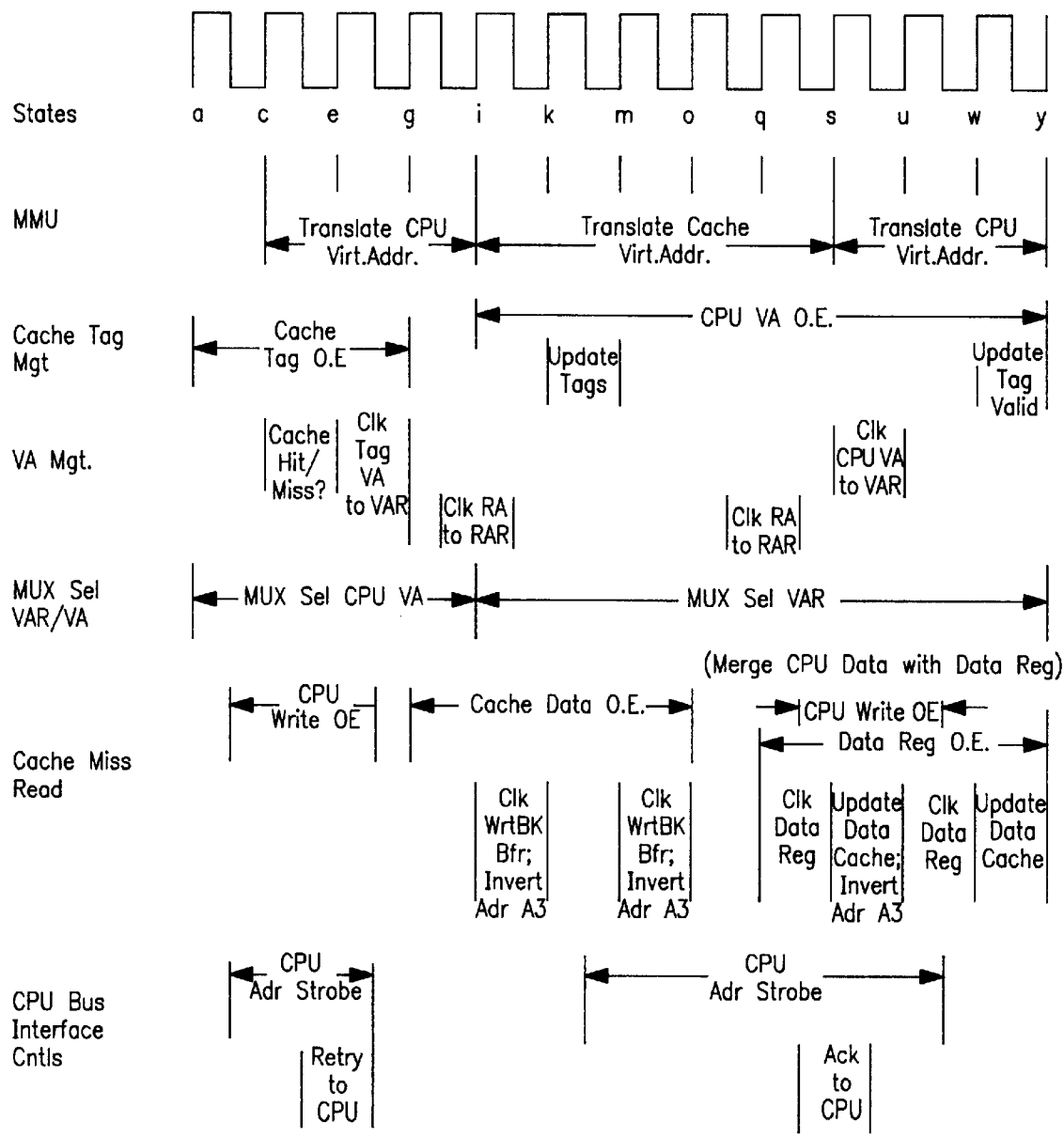
FIG. 8 is a timing diagram for best case timing for a cache write miss.
Figure 9:
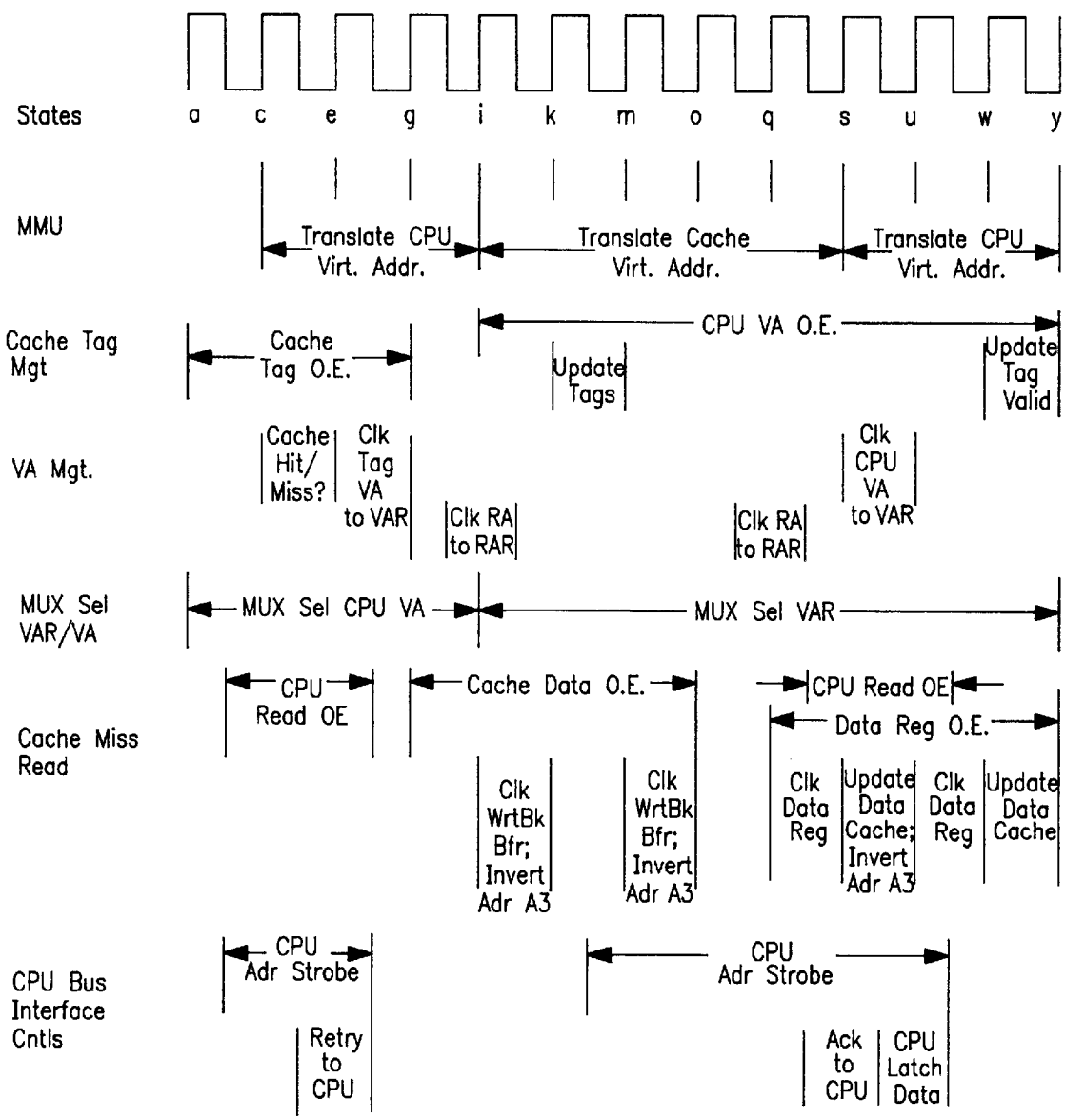
FIG. 9 is a timing diagram for best case timing for a cache read miss.
Figure 11:
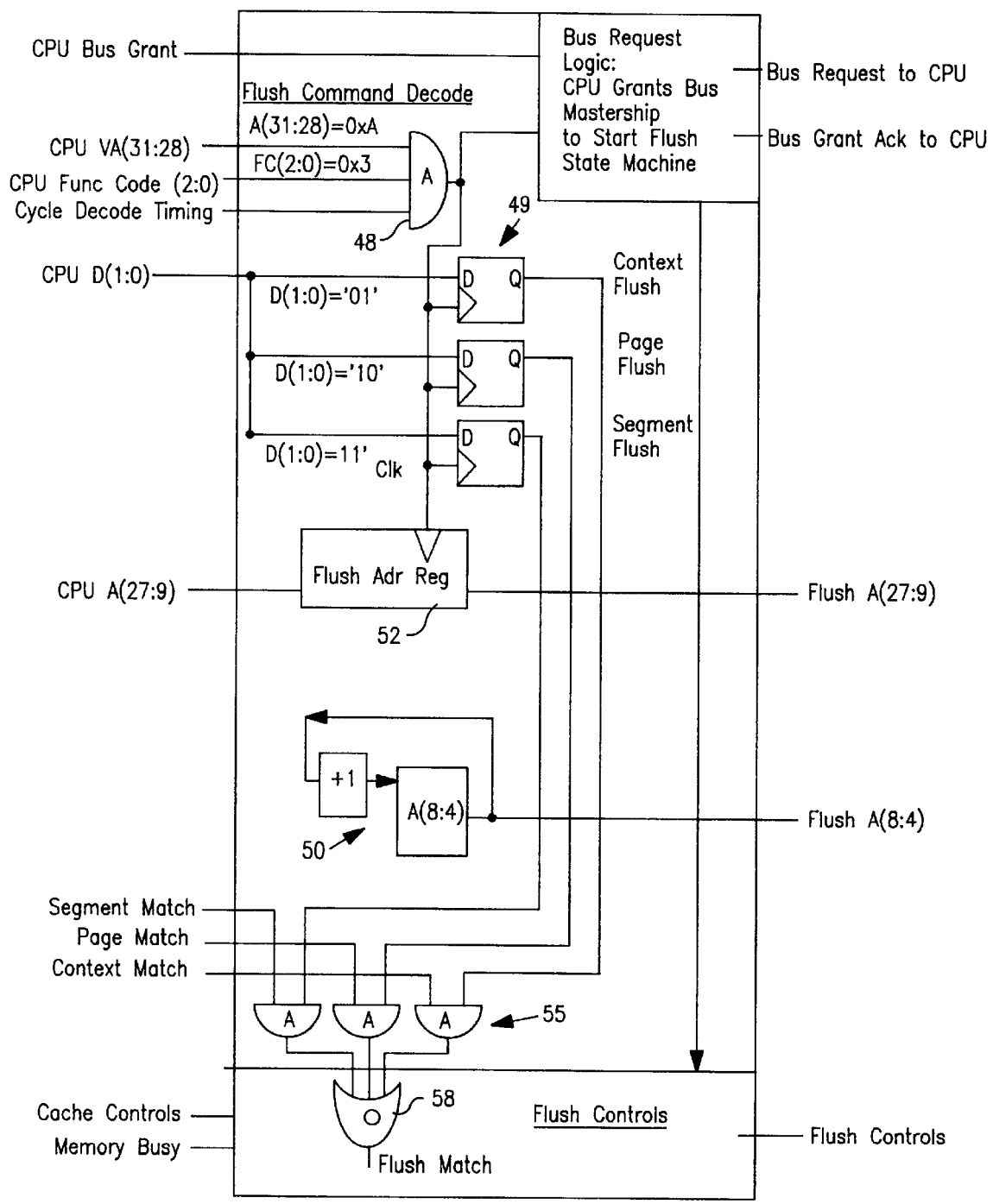
FIG. 11 is a schematic diagram showing the cache flush implementation of the present invention.
Figure 12:
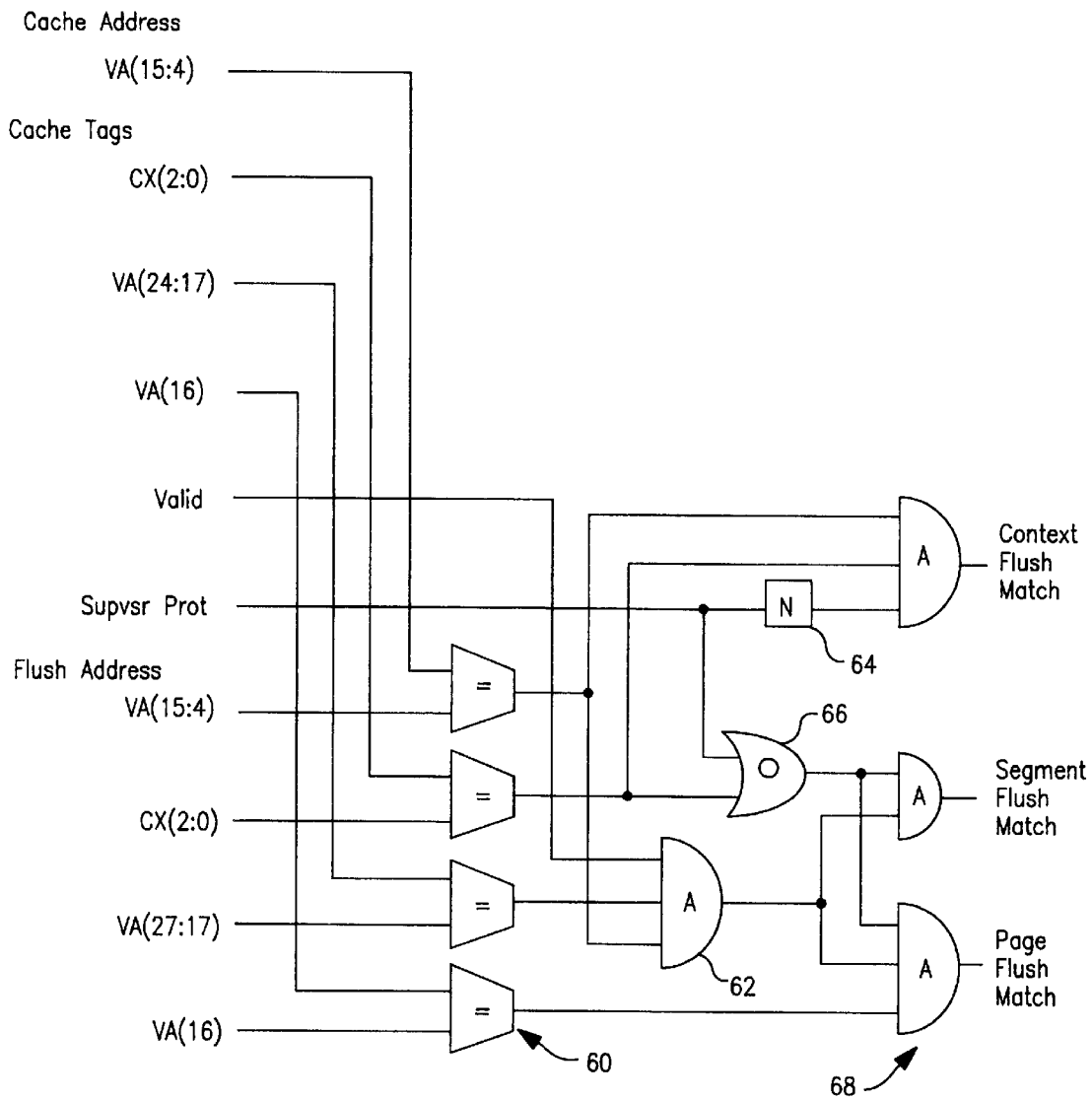
FIG. 12 is a schematic diagram showing the logic for detection of Context Flush Match, Segment Flush Match and Page Flush Match.
Figure 13A:
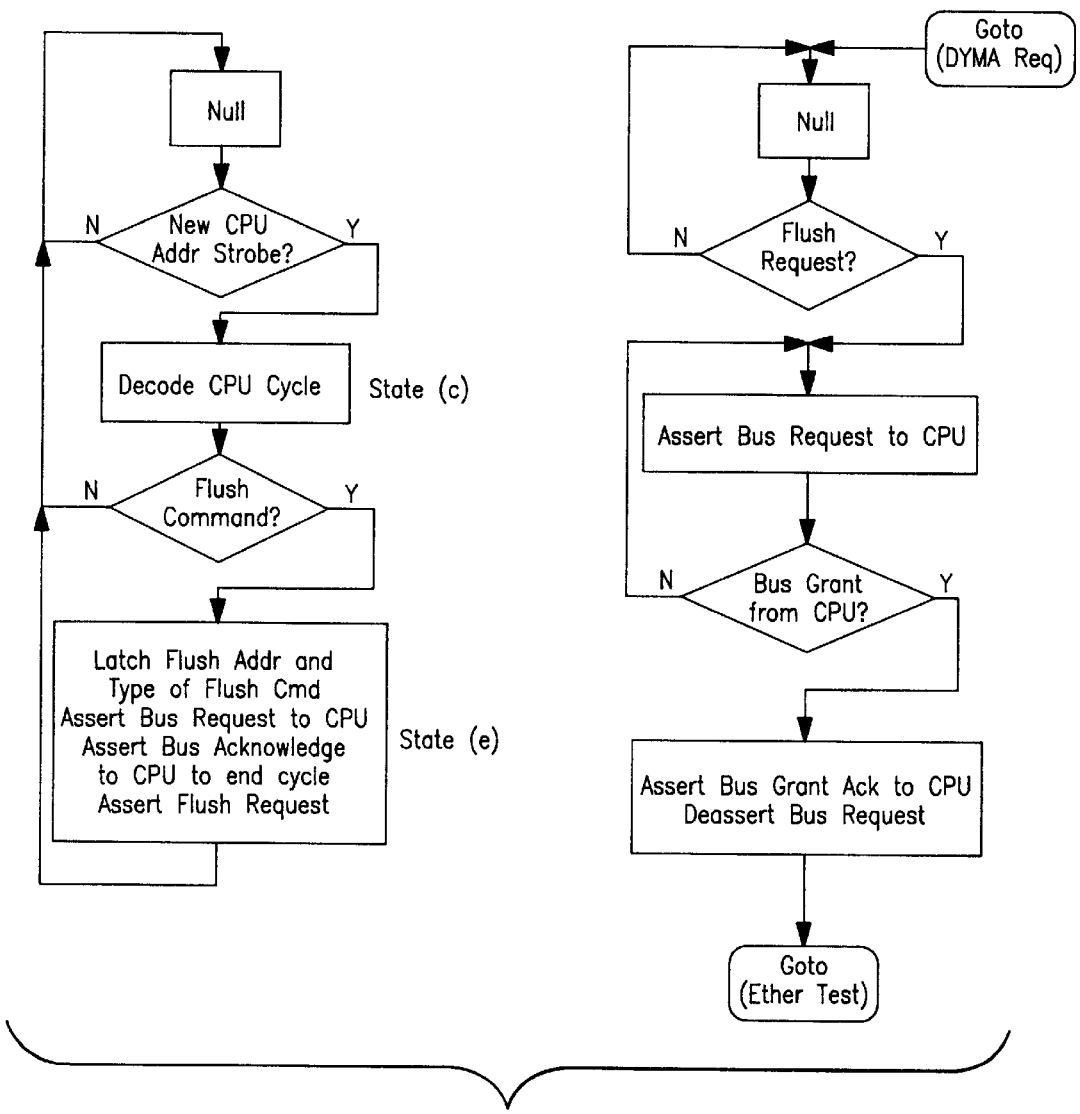
FIG. 13 (13a–13e) is a flow diagram of a state machine implementation of a cache flush initiated by the issuance of a flush command.
Figure 13B:
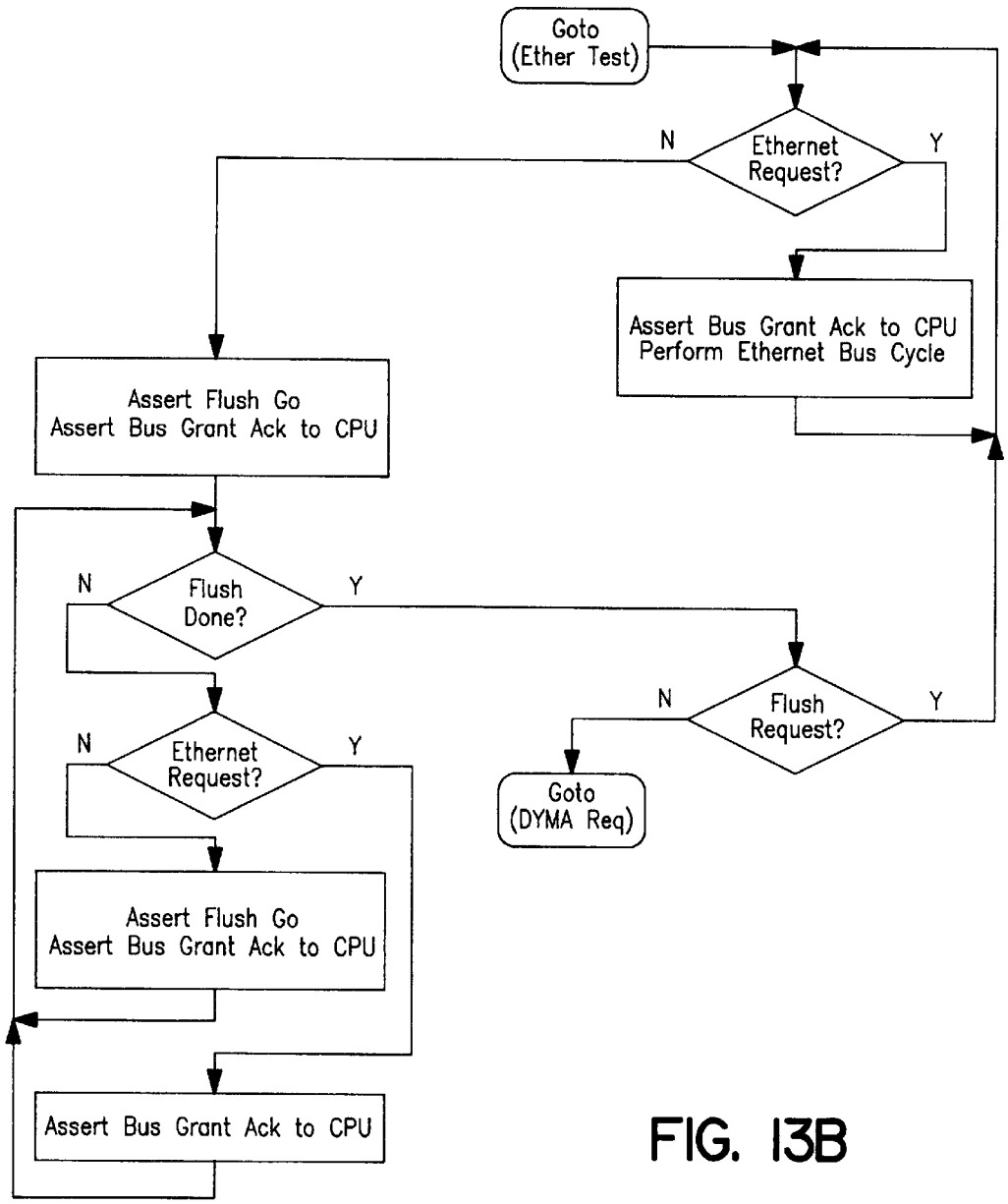
Figure 13C:
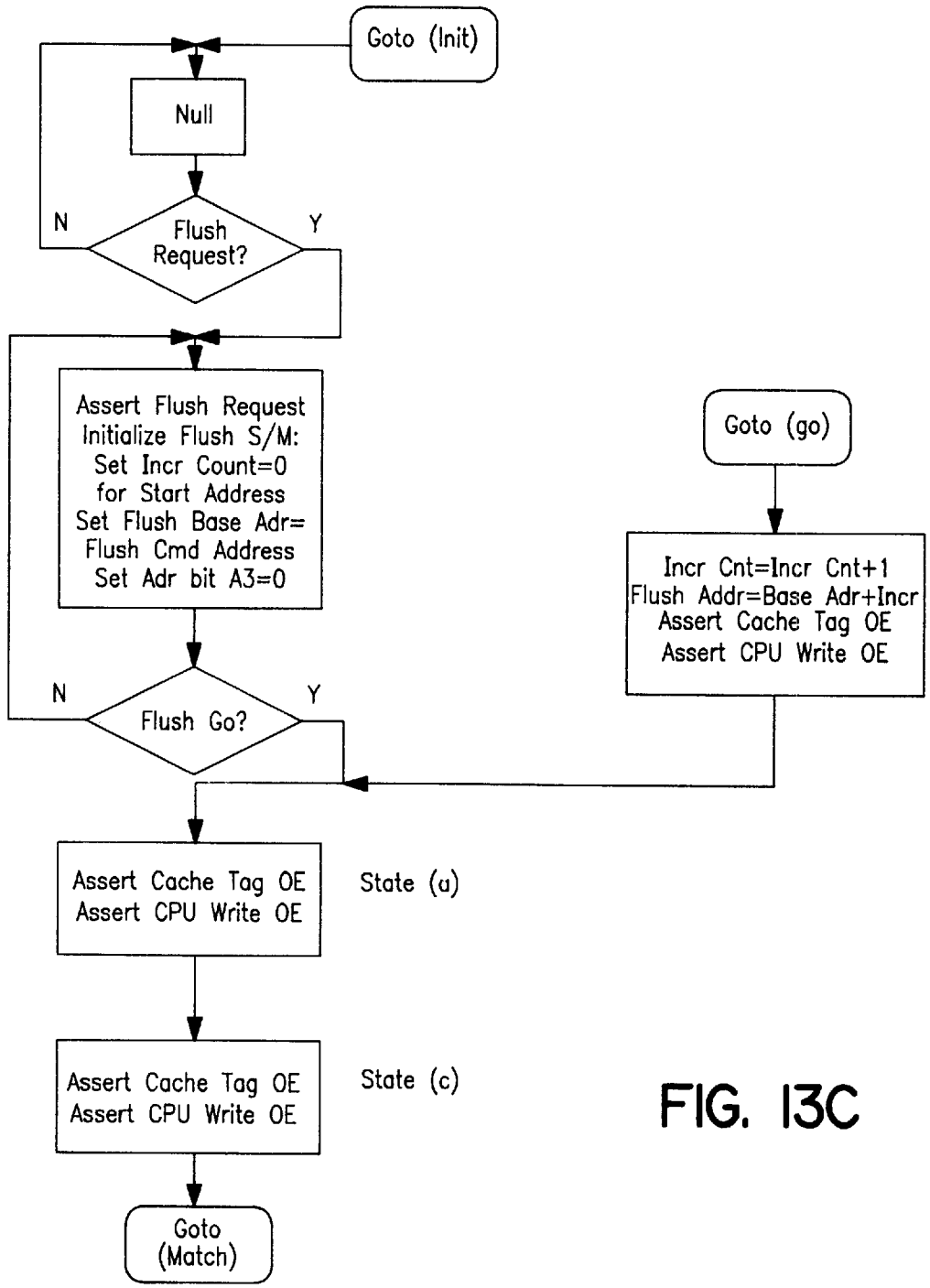
Figure 13D:
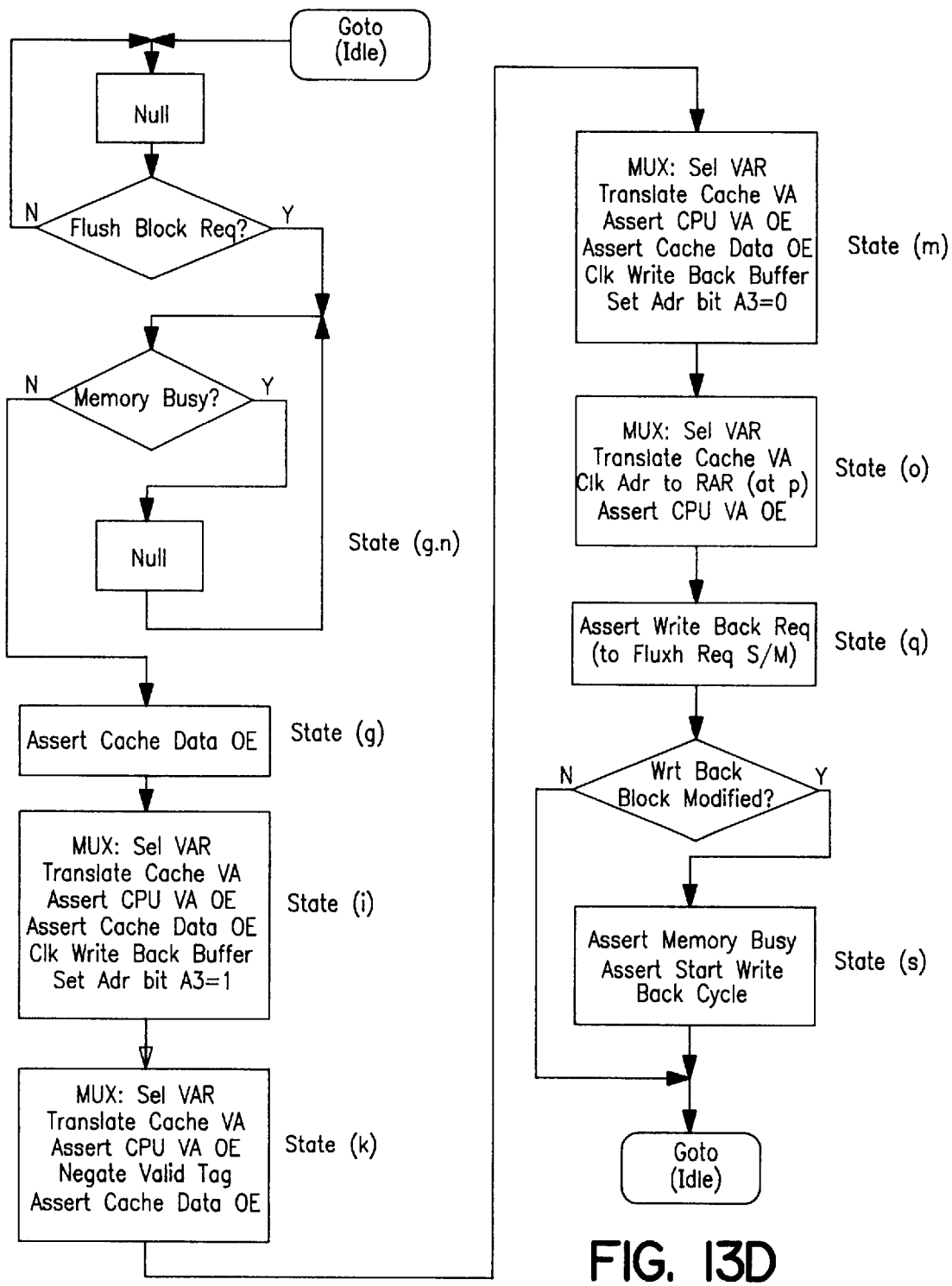
Figure 13E:
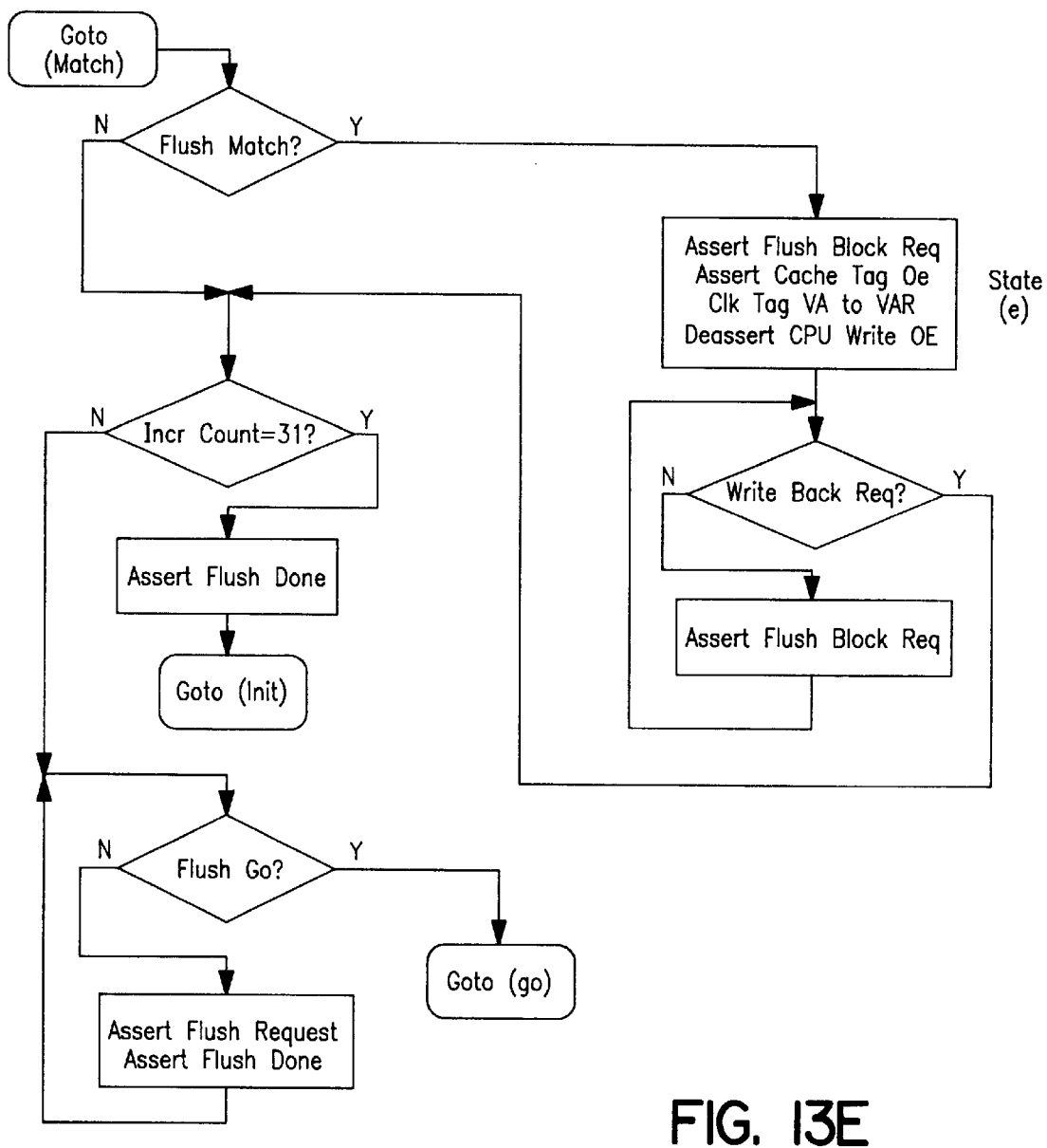

The preferred embodiment of the virtual address cache for the address path is shown in FIG. 3 and for the data path is shown in FIG. 5. Flush control logic in the preferred embodiment is implemented as shown in FIGS. 11, 12, the state machine of FIG. 13 and timing diagram of FIG. 14. A best case timing diagram for writes is shown in FIG. 8 and for reads is shown in FIG. 9.

In addition to components previously discussed with reference to FIG. 1, FIG. 3 includes virtual address register (VAR) 54 which stores the current virtual address. The elements of the invention appearing in FIG. 3 are cache flush logic 33, the Protection bits (P) in the cache tag array 23, and the flush match logic 24 which is part of cache hit detect logic 25.

Also shown in FIG. 5 is data register 61 which stores data to be written to or which has been read from memory 31 or cache data array 19.

In FIGS. 2, 3, 5, 11 and 12, to avoid unnecessarily cluttering the Figures, not all control lines are shown.

However, the control lines necessary for proper operation of the invention can be ascertained from the flow chart of the state machines shown in FIGS. 4, 6, 7 and 13, and timing diagrams shown in FIGS. 8–10 and 14.

In the flow charts, the following abbreviations are utilized:

MUX—multiplexor 45

Sel—select

VA—virtual address

RA—real address

OE—output enable

Ack—acknowledge

Cache Hit?—Did cache "hit" logic 25 detect a cache hit? (FIG. 2a)

Cache Protect Violation?—Did control logic 40 detect a detect a cache protect violation? (FIG. 2b)

Memory Busy?—Has Memory Busy been asserted?

MMU Protect Viol?—Did control logic 40 detect a MMU protect violation? (FIG. 2c)

RAR—real address register 51

CLK—clock

Adr—address

Mem Adr Strobe—memory 31 address strobe

VAR—virtual address register 54

Mem Adr Ack?—Has a memory address acknowledge been asserted by memory 31?

Mem Data Strobe 0?—Has memory data strobe 0 been asserted?

Mem Data Ack 0?—Has memory data acknowledge 0 been asserted?

Mem Data Strobe 1?—Has memory data strobe 1 been asserted?

Mem Data Ack 1?—Has memory data acknowledge 1 been asserted?

Clk Write Back Buffer—clock write back buffer 39

CPU Read Cycle?—Is CPU 11 in a read cycle

Clk Data Reg—clock data register 61

Valid and Modified Write—Has control logic 40 detected

Back Data?—Valid bit(V) and Modified bit(M)

Start Write Back Cycle?—Has control logic 40 asserted Start Write Back Cycle

Similar abbreviations are used in the timing diagrams of FIGS. 8–10 and 14.

Figure 4A:
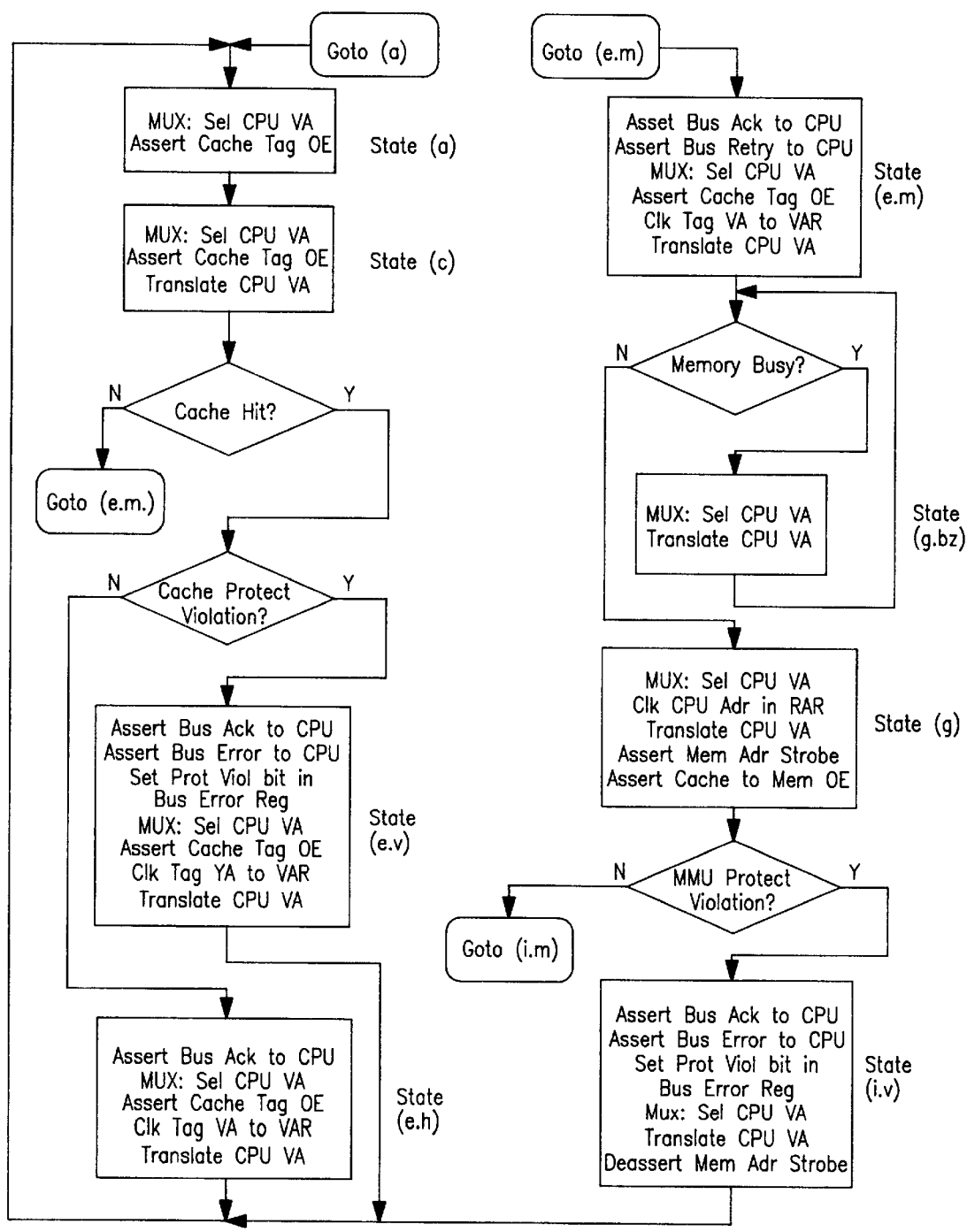
FIG. 4 (4a, 4b) is a flow diagram of a state machine implementation for certain controls related to the addressing of a virtual address write back cache.
Figure 4B:
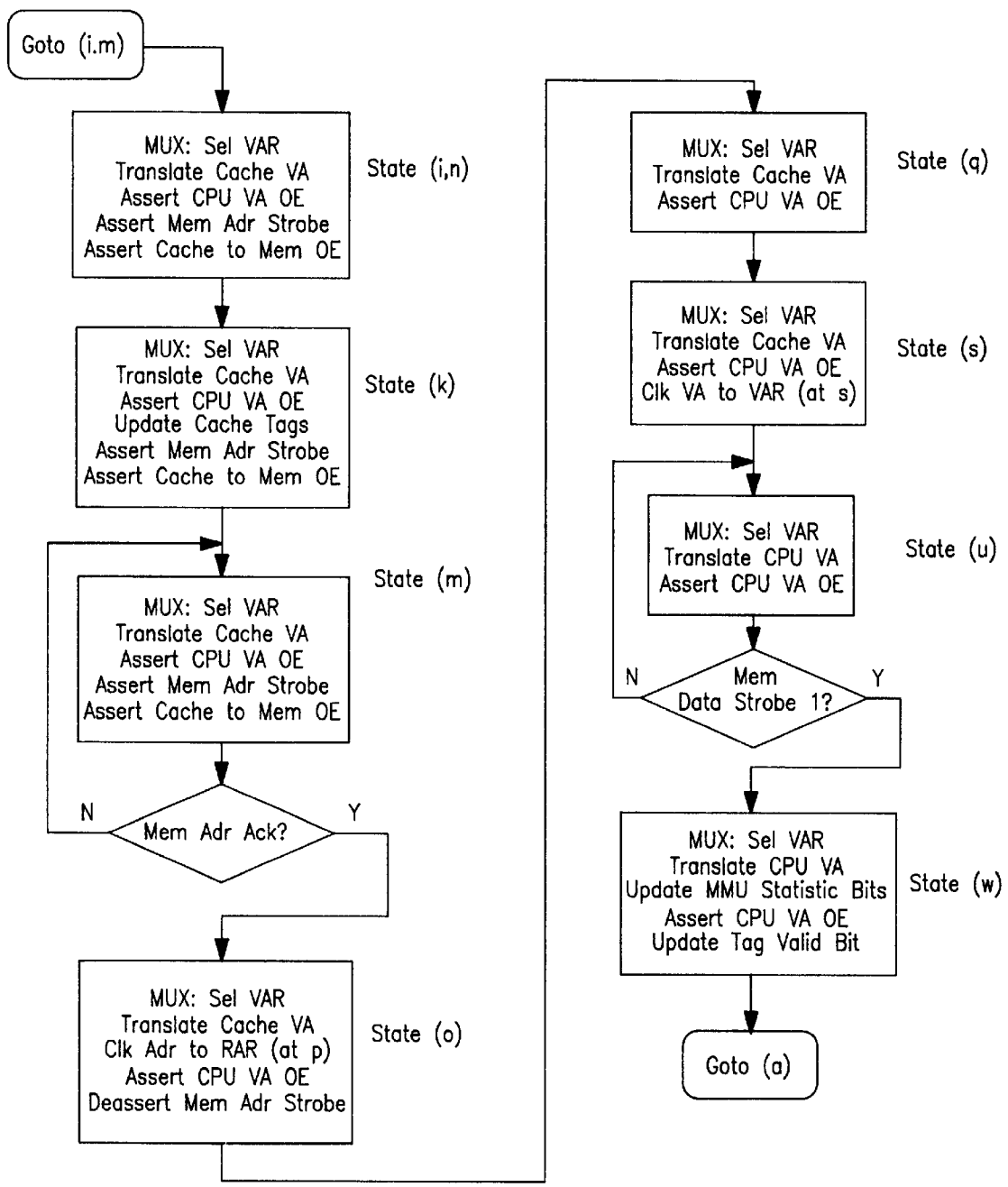

The address state machine shown in FIGS. 4a and 4b defines certain of the controls related to the address handling portion of cache 19. The cache tags within cache tag array 23 are written as Valid during state (w), following a successful transfer of all block data from memory 31. The invention is integrated through the inclusion of the Cache Protection Violation test following state (c). If a Protection Violation is found on a cache Hit, then the CPU bus cycle is terminated immediately with a Bus Error response to the CPU. The MMU Protection Violation on the translated address is performed later, following state (g).

The data state machine shown in FIGS. 6a–6d define certain controls related to the data transfer portion of the cache. Again, the invention is supported by including a test for the Cache Protection Violation following state (c). The MMU Protection Violation test on the translated address is similarly performed in state (g).

Figure 7:
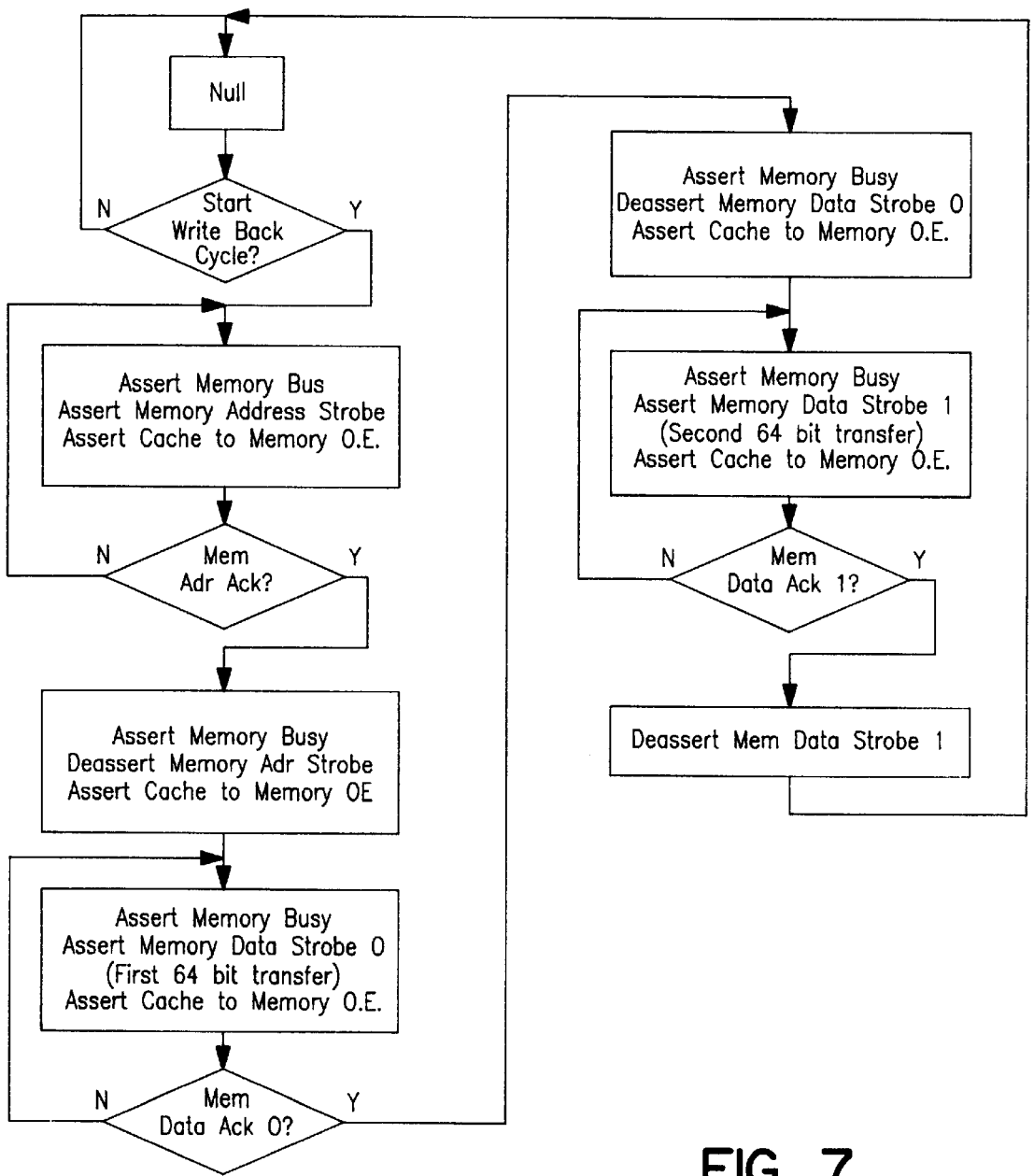
FIG. 7 is a flow diagram of a state machine for implementation for controlling Write Back bus cycles to memory.

The write back state machine shown in FIG. 7 defines the control of the Write Back bus cycle to memory. This cycle may be performed in parallel with CPU cache accesses, since both the Write Back controls and data path are independent of the cache access controls and data path. As described below, the "Memory Busy" signal causes the address and data state machines to wait until a previous Write Back cycle has completed.

The write cache miss timing diagram shown in FIG. 8 defines the overall timing of a CPU write bus cycle to memory which misses the cache. The cache Hit and Protection Check occur in cycle (c) in this diagram.

A part of the miss handling sequence includes the loading of the current cache block which is being replaced into write back buffer 39 in cycles (i) and (m). The translated address for the current cache block is also loaded into real address register 51 in cycle (o). If the current cache block is both Valid and Modified from a previous CPU (or DVMA) write cycle, then this cache block will be written back to memory 31 through a Write Back bus cycle, described in both the Memory Data Bus timing and the Write Back state machine, FIGS. 10 and 7 respectively.

The CPU write data is merged with block data returned from memory on the first data transfer of a Block Read memory bus cycle. During cycles (q) through (u), the CPU Write Output Enable controlling buffers 38 will be active for only those bytes to be written by the CPU, while the Data Register Output Enable controlling data register 61 will be active for all other bytes. During the second data transfer, cycle (w), the Data Register Output Enables for all bytes will be active.

The read cache miss timing diagram shown in FIG. 9 defines the overall timing of a CPU read bus cycle to a cacheable page in memory which misses the cache. The cache Hit and Protection Check occur in cycle (c) in this diagram.

A part of the miss handling sequence includes the loading of the current cache block which is being replaced into write back buffer 39 in cycles (i) and (m). The translated address for the current cache block is also loaded into real address register 51 in cycle (o). If the current cache block is both Valid and Modified from a previous CPU (or DVMA) write cycle, then this cache block will be written back to memory 31 through a Write Back bus cycle, described in both the Memory Data Bus Timing and the Write Back State Machine, FIGS. 10a and b and 7 respectively.

Data is read to the CPU by simultaneously bypassing the data to the CPU through buffers 38 enabled by control signal CPU Read Output Enable, active in states (q) through (u), and updating the cache, in state (s). The memory is designed to always return the "missing data" on the first 64 bit transfer, of a Block Read memory bus cycle and the alternate 64 bits on the subsequent transfer. After the CPU read bus cycle data is returned, the CPU may run internal cycles while the cache is being updated with the second data transfer from memory.

Figure 10A:
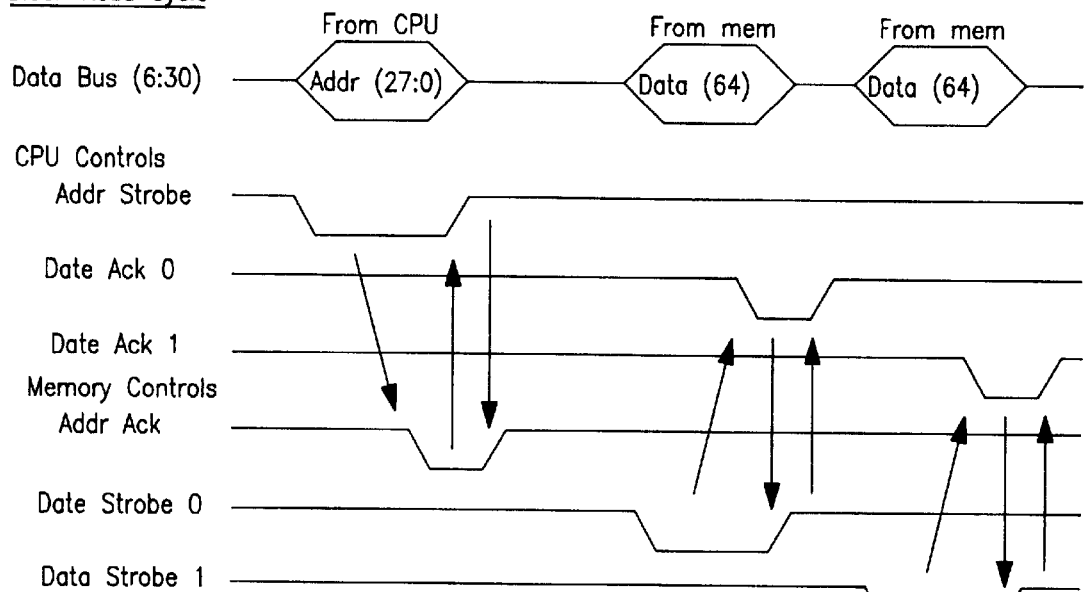
FIG. 10a is a timing diagram of the memory bus cycle for performing a block read cycle.
Figure 10B:
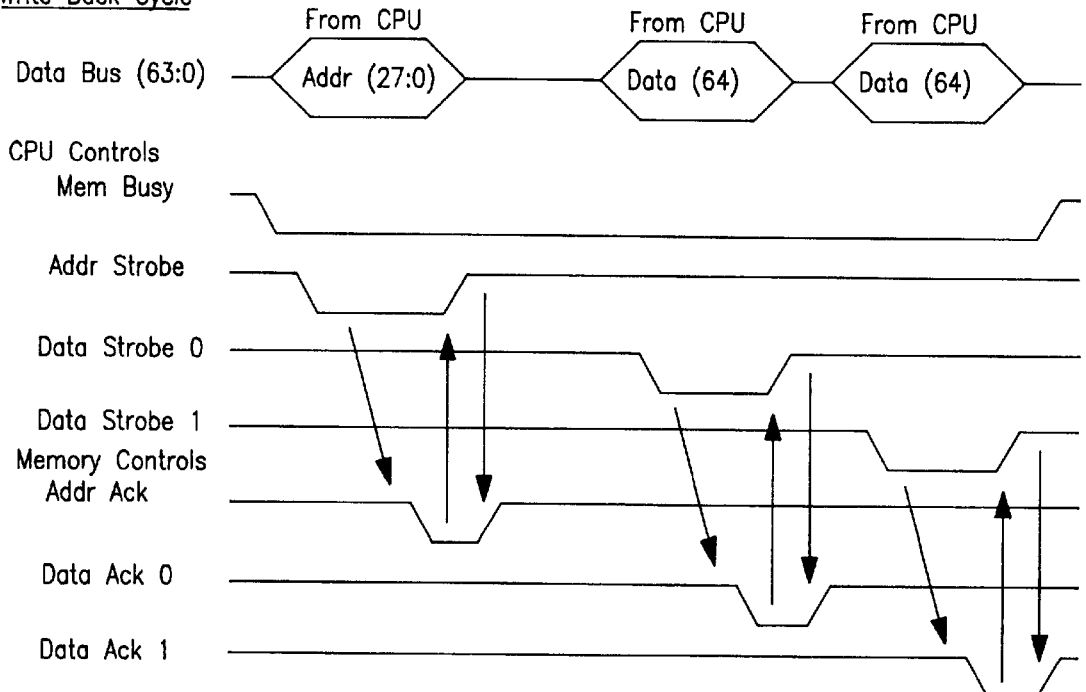
FIG. 10b is a timing diagram of the memory bus cycle for performing a write back cycle.

The Memory Data Bus timing shown in FIG. 10a and 10b shows the timing of Block Read and Write Back bus cycles. Since the cache block size is 128 bits, each cache block update requires two data transfers. As indicated above the 64 bits containing the data addressed by CPU 11 are always returned on the first transfer for Block Read bus cycles. The "Memory Busy" control signal active during the Write Back cycle is used to inhibit the start of the next cache miss cycle until the previous Write Back cycle can complete.

Cache flush logic 33 shown in FIG. 11 outlines the control and data path of the flush controller. This controller implements the cache flush operations of the present invention for a system with multiple active user contexts and a shared operating system. Cache flush logic comprises AND gate 48, flip-flops 49, flush address register 52, incrementer 50, AND gates 55 and OR gate 58.

Three flush match signals are used by cache flush logic 33 to determine whether the addressed cache block is to be flushed. Corresponding to the three flush match signals are three flush commands issued by the CPU. A Flush Match is said to occur if:

(Context Flush Command) AND (Context Flush Match Signal)

OR (Segment Flush Command) AND (Segment Flush Match Signal)

OR (Page Flush Command) AND (Page Flush Match Signal).

An implementation of such flush match logic is shown in FIG. 12 comprising comparators 60, AND gate 62, Inverter 64, OR gate 66 and AND gates 68.

Flush control logic 33 involves two distinct phases, which are shown as separate sequences in the flush state machine, FIG. 13. The first phase involves decoding a Flush command from the CPU and obtaining bus mastership for the Flush Control State Machine. The Flush command is issued by the CPU in Control Space (identified by Function Code bits FC(2:0)=0×3). Within Control Space, the four high order address bits A(31:28)=0×A indicate the Flush command. The address field A(27:0) for the command correspond to the 28 bit virtual address field for data accesses. The Flush command data bits D(1:0) encode the type of flush. After the Flush command is decoded, the address field A(27:9) is latched together with the type of flush. A Bus Request signal is asserted to the CPU to obtain bus mastership.

The second phase involves performing DVMA cycles to test and flush, if necessary, 32 cache blocks using cache flush logic 33 as a DVMA device. This DVMA device addresses cache blocks with the virtual address A(27:9) captured from the flush command, plus address bits A(8:4) from an internal 5 bit flush address counter 50. Each cache block may be checked in three cycles, with the three Flush Match signals gated by the Flush command latches 55 to determine a "Flush Match" condition. A "Flush Match" results in the cache block being invalidated and a Modified block being written to memory through the Write Back state machine. Following the conclusion of the 32 block check, bus mastership may be returned to the CPU.

Note that as a DVMA device, the cache flush logic 33 competes with other DVMA devices for bus ownership. Of the possible three DVMA devices, Ethernet (not shown) has the highest priority; the cache flush logic 33 second priority; and VMEbus devices third. The flush control state machine does not include a complete arbitration description for all DVMA devices, but rather only logic related to the Flush.

The cache flush state machine shown in FIG. 13 comprises four interacting machines which control the flush operation. These four machines control the decode of the CPU Flush command and its application to 32 cache blocks. The four machines are described below:

1) The Command Decode machine decodes the Flush command executed by the CPU. Upon decoding a Flush command, the flush virtual address A(27:9) and the type of Flush command are latched. The machine asserts a Bus Request to the CPU to obtain bus mastership for the flush state machine. It also asserts a Flush Request signal to activate the DVMA machine, below.

2) The DVMA machine obtains bus mastership from the CPU, as indicated by the CPU's asserting Bus Grant, and holds mastership by asserting Bus Grant Acknowledge. It arbitrates the Flush with the higher priority Ethernet requests.

3) The Flush Compare machine initializes its address counter A(8:4) to 0 with the Flush Request signal. It continues to check cache blocks as long as Flush Go is asserted by the DVMA machine. When Flush Go is deasserted, a Flush Done signal is set at the of the current block flush, which signals the DVMA machine to grant mastership to the Ethernet handler. If a Flush Match is detected, the Flush Block Request signal is asserted to activate the Flush Match machine. At the conclusion of the Flush Match machine, this machine returns a Write Back Request signal to complete the machine's handling of the current cache block.

4) The Flush Match machine loads the cache data into write back buffer 39, clocks the translated cache address in real address register 51, and invalidates the cache tags within cache tag array 33. Note that no protection check is performed. At the conclusion, the Write Back Request signal is asserted. If the cache block is marked as Modified, the Start Write Back Cycle signal is also asserted to activate the write back state machine shown in FIG. 7.

Figure 14:
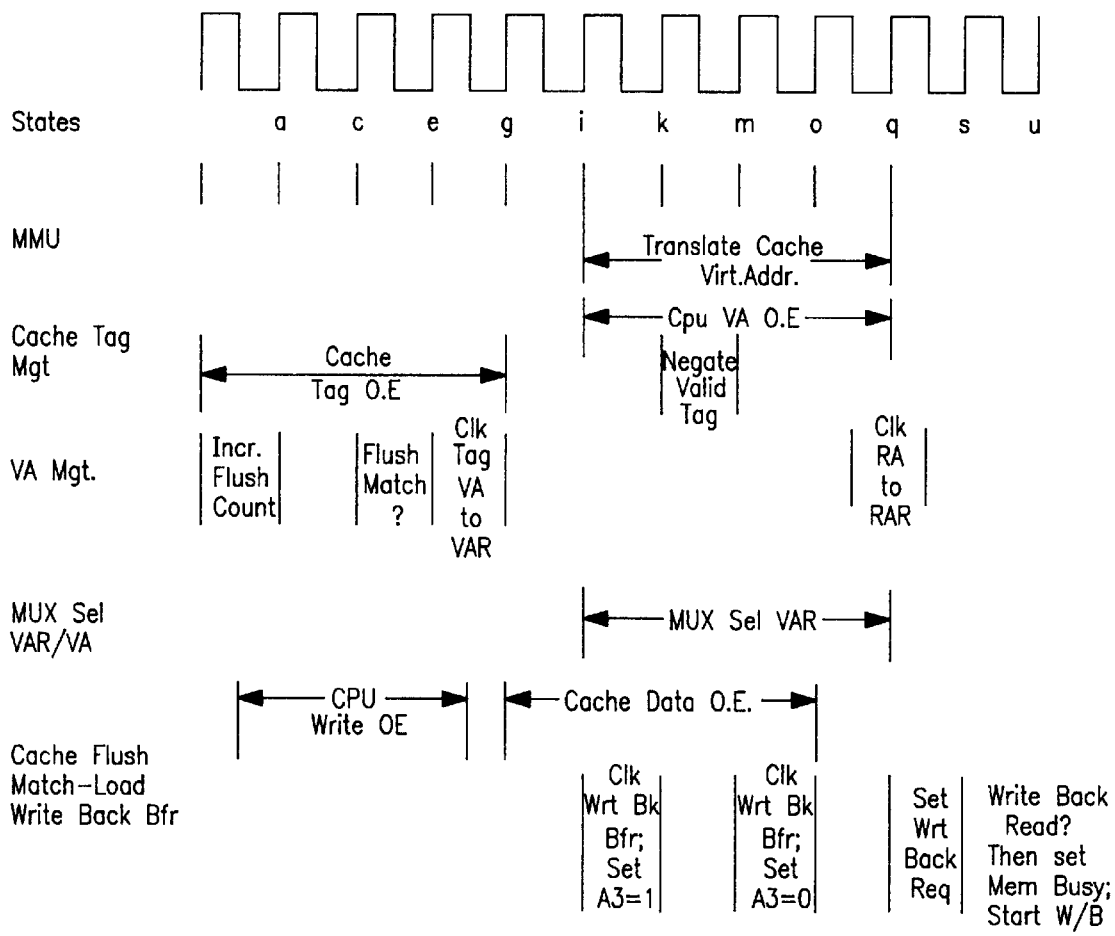
FIG. 14 is a timing diagram for a cache flush.

FIG. 14 shows cache flush timing and describes the timing of a block flush in the event of a "Flush Match". This condition is tested in state (c). The block is invalidated in state (k). If the block satisfies the "Flush Match" and is Modified, then it must be written back to memory. A "Start Write Back Cycle" signal is asserted in state (s) to begin the Write Back state machine.

The kernel changes needed to support the virtual address write back cache of the present invention for the Unix operating system are shown in Appendix A.

APPENDIX A

Kernel Design Document for Virtual Address Cache

I. An Invariant Condition

To guarantee the correctness of the Virtual Address Cache (called cache in short), we keep the following invariant condition true at all times.

If an entry is in the cache, its mapping from virtual address to physical address must be correct.

This is a sufficient condition for the correctness of the system because of the following:

While the mapping is correct, reading a byte/word from the cache is the same as reading it from the physical memory through MMU

APPENDIX A-continued

Kernel Design Document for Virtual Address Cache with the cache being turned off. Thus, reading is correct.
The byte/word written to the cache will be written to the corresponding physical memory when this byte/word is flushed. So, as long as we keep the mapping correct when a byte/word in the cache is flushed, writing to the cache is the same as writing to the physical memory through MMU with the cache being turned off. Thus, writing is correct.

It is clear that the above invariant condition can be kept if we flush the affected cache lines before a virtual to physical mapping becomes incorrect.

II. Cache Flushing Strategies

1) Since cache flushing is time-consuming, we avoid cache flushing if we can. On a SUN-3/200 machine, a page flush takes no less than 50 microseconds and a segment or context flush takes no less than 400 microseconds, excluding the overhead of software instructions.
2) For doubly mapped virtual addresses, if both virtual addresses can be accessed simultaneously, they have to be arranged to match in their low order 17 bits, i.e. modulo 128K, as described in the Sun-3 Architecture Manual. Otherwise, i.e. if they are accessed one at a time, we consider the currently used mapping correct and other mappings incorrect at this time. That is, the virtual addresses of other not-currently-used mappings are not in the cache.
3) We ignore the problems of reading/dev/mem because a) access of /dev/mem is not guaranteed to be consistent even on systems without the virtual address cache, 2) such added inconsistence is minimal. (because most of such usages are for the u areas of non-running processes and these u pages are already flushed during context switches), and 3) making system behaves as the system without cache requires the kernel turn off the cache of the entire system while /dev/mem is opened. This means any user process can slow down the entire system considerably by open /dev/mem.

III. The new routines:

The following routines are added to the kernel:
1) vac_ctxflush( ) flushes the cache by context-match. It flushes all cache lines whose supervisor bits in the cache tag are off AND whose context id's in cache tags match that of the MMU context register. I.e. it flushes an entire user context. vac_ctxflush( ) is defined in map.s.

2) vac_segflush(segment_number) flushes the cache by segment-match. It flushes all cache lines whose segment address parts (A<16–27> in SUN-3) of the cache tag match "segment_number" either from a kernel address space or from the current user's address space. I.e. it flushes either a kernel segment or a user segment of the current user context. vac_segflush( ) is defined in map.s.

3) vac_pageflush(virtual_address) flushes the cache by page-match. It flushes all cache lines whose page address parts (A<13–27> in SUN-3) of the cache tag match the page number part of "virtual_address" either from a kernel address space or from the current user's address space. I.e. it flushes either a kernel page or a user page of the current user context. vac_pageflush( ) is defined in map.s.

4) vac_flush(virtual_address, number_of_bytes) flushes the cache lines whose page address parts (A<13–27> in SUN-3) of the cache tags are in the ranges of ["virtual_address", "virtual_address" + "number_of_bytes" – 1]. It flushes these lines either from a kernel address space or from the current user's address space. vac_flush( ) is used either to flush less than a page, such as from resume( ), or to flush a number of contiguous pages, such as from pageout( ). vac_flush( ) is defined in map.s.

5) vac_flushall( ) flushes the entire cache. It is used to flush the entire cache to the physical memory before we dump the physical memory from dumpsys( ). It may also be used as an debugging tool. vac_flushall( ) is defined in vm_machdep.c.

6) vac_disable_kpage(virtual_address) turns off the caching of a kernel page starting at "virtual_address". It is used by the device driver mmap( ) routine to enforce the consistency of sharing a kernel page with user pages. vac_disable_kpage( ) is defined in vm_machdep.c.

7) vac_enable_kpage(virtual_address) turns on the caching of a kernel page starting at "virtual_address". If a device driver mmap routine knows that no more user pages are sharing a kernel page, it calls vac_enable_kpage( ) to allow the caching of this kernel page. vac_enable_kpage( ) is defined in vm_machdep.c IV. Where and how do we flush the cache?

1) We call vac_ctxflush( ) from ctxfree( ) in vm_machdep.c.

APPENDIX A-continued

Kernel Design Document for Virtual Address Cache

{ Ctxfree( ) is called when a context is freed from MMU and hence the mapping of the whole context is not valid. Ctxfree( ) is called from ctxalloc( ) when the oldest context is bumped out of MMU, from swapout( ) when a process is swapped out, from exit( ) when a process is terminated, and from ptexpand( ) when this context is given up before its pte's are expanded. }

2) We call vac_ctxflush( ) from vrelvm( ) in vm_proc.c.
   { Vrelvm( ) releases the vm resources associated with this process. This will cause all virtual and physical pages of the process be released and thus invalidate all virtual to physical mappings of the current context. }
3) We call vac_ctxflush( ) from expand( ) in vm_proc.c.
   { This happens when a process is shrinking and it gives back some virtual memory. }
4) We call vac_ctxflush( ) from ovadvise( ) in kern_mman.c.
   { When the parameter to vadvise( ) is VA_FLUSH, we invalidate all page table entries of the current process. A context flush is more efficient than a number of page flushes. }
5) We call vac_segflush( ) from pmegrelease( ) in vm_machdep.c
   { Pmegrelease( ) is called when a pmeg is taken away. Pmegrelease( ) can be called by either pmegalloc( ) or pmegallocres( ). }
6) We call vac_segflush( ) from pmegload( ) in vm_machdep.c.
   { A segment in the hole is to be freed and set to SEGINV in the segment map. }
7) We call vac_pageflush( ) from pageout( ) in vm_page.c.
   { This is when a page is marked invalid by the pageout demon. }
8) We call vac_pageflush( ) from ovadvise( ) in kern_mman.c.
   { This is when ovadvise( ) marks a page invalid. }
9) We call vac_pageflush( ) from mapout( ) of vm_machdep.c.
   { Mapout( ) is called to release a mapping from kernel virtual address to physical address.
   Mapout( ) is called from:
   a) physstrat( ) when mapping from kernel virtual address to user buffer address is released.
   b) wmemfree( )
   c) cleanup( )
   d) ptexpand( ) to release old page tables. }
10) We call vac_pageflush( ) from pagemove( ) of vm_machdep.c.
    { In pagemove( ) we call vac_pageflush(to) because the mapping of "to" to its physical page is not valid after setpgmap( ) call. We call vac_pageflush(from) because the mapping of "from" to the physical page is not valid after the second setpgmap( ) call. }
11) We call vac_pageflush( ) from mbrelse( ) of sundev/mb.c.
    { This is when setpgmap(addr, 0) is called to invalidate the mapping from DVMA virtual addresses to physical addresses. }
12) We call vac_flush( ) from resume( ) in vax.s.
    { At the end of context switch time, the mapping of the outgoing process's u becomes invalid. We should flush the outgoing process's u before its u mapping becomes invalid. Since context switch happens very frequent, we only flushes the user struct and the kernel stack, instead of flushing the entire u page. (Resume( ) is also called from procdup( ) to force an update of u.) }
13) We call vac_flush( ) from smmap( ), munmap( ), and munmapfd( ) in kern_mman.c.
    { Virtual to physical mappings of some pages are changed. }
14) We call vac_flushall( ) from dumpsys( ) of machdep.c to flush out the content of the entire vac to physical memory in order to dump out the physical memory.
15) There are a number of places where virtual-to-physical mappings are invalidated implicitly, e.g. the pme/pte mapping is still valid but this mapping is never used again. We must flush the associated portion of cache, otherwise, when a new mapping is set up from this virtual address, the cache may contain some lines of the previous mapping.
    a) We call vac_pageflush( ) from mbsetup( ) of sundev/mb.c.
       { In mbsetup( ), the mapping from pte's to physical pages is temporarily (until mbrelase) replaced by the mapping from DVMA virtual addresses. }
    b) We call vac_pageflush( ) from dumpsys( ) of machdep.c.
       { The last page in the DVMA region is used to map to one physical page at a time to dump out the physical memory.

APPENDIX A-continued

Kernel Design Document for Virtual Address Cache

Such a mapping is invalid each time after (*dumper)( )
is called. }
- c) We call vac_pageflush( ) from physstrat( ) of machdep.c.
  { In physstrat( ), "user" pages are doubly mapped to
  the kernel space. We flush these user pages when we set
  up the associated kernel pages. Later, these mappings from
  kernel virtual pages to physical pages are invalidated by
  mapout( ), there these kernel virtual addresses are
  flushed. }
- d) We call vac pageflush( ) from copyseg( ) of machdep.c.
  { In copyseg( ), the mapping from virtual address CADDR1
  to physical address "pgno" becomes invalid after copyin( ).
  }
- e) We call vac_pageflush( ) from mmrw( ) of sun3/mem.c.
  { In mmrw( ), the mapping from "vmmap" to a physical address
  is set up to copy physical data to the user space. This
  mapping becomes invalid after uiomove( ). }
- f) We call vac_pageflush( ) from pagein( ) in vm_page.c.
  { The mapping from CADDR1 to physical page pf + i becomes
  invalid after bzero( ). }
- g) We call vac_flush( ) from procdup( ) of vm_proc.c
  to flush the kernel stack and u_* parts of forkutl.
  { In procdup( ), forkutl maps to the physical u page
  of the child process through vgetu( ).
  Since the mapping from forkutl to the physical u page
  of the child becomes invalid when the parent returns from
  procdup( ), forkutl is flushed before procdup( ) returns.
  }
- h) We call vac_flush( ) from newproc( ) of kern_fork.c
  to flush the u_* part of vfutl.
  { In newproc( ), in the case of vfork, vfutl maps to
  the physical page of the child through uaccess( ).
  This mapping is not used anymore after vpassvm( )
  is called. }
- i) We call vac_flush( ) from swapout( ) of vm_swap.c
  to flush the u_* part of utl.
  { In swapout( ), mapping from utl, which is either
  xswaputl or xswap2utl, to the physical u page of proc p
  is invalid after proc p is swapped out. }
- j) We call vac_flush( ) from swapin( ) of vm_swap.c
  to flush the u_* part of utl.
  { In swapin( ), mapping from swaputl to the physical
  u page of proc p becomes invalid before we return from
  swapin( ). }
- k) We call vac_pageflush( ) from swap( ) of vm_swp.c.
  { The mapping from i-th virtual page of process 2 to
  the physical page is not valid anymore. }
- l) We call vac_flush( ) from pageout( ) of vm_page.c
  to flush the u_* part of pushutl.
  { In pageout( ), the mapping from pushutl to the physical
  u page of rp becomes invalid after the vtod( ) call. }
- m) We call vac_flush( ) from pageout( ) of vm_page.c to
  flush the cluster of pages to be paged out.
  { Swap( ) maps the physical pages of these pages to virtual
  addresses of proc[2] before it calls physstrat( ). Thus,
  the mappings from the outgoing virtual pages to physical
  pages are to be replaced by those of proc[2] virtual pages
  to these physical pages. Therefore, we flush these pages
  in pageout( ) before swap( ) is called. }
- n) We call vac_pageflush( ) from kmcopy( ) of vm_pt.c.
  { kmcopy( ) is called from ptexpand( ) to "copy" pte's
  from old pte's to new pte's. It "copies" by mapin( )
  new pte's to the physical pages of old pte's. We flush
  old pte's before new pte's are mapped-in. }
- o) We call vac_pageflush( ) from distpte( ) of vm_pt.c.
  { distpte( ) is called when the pte entries of a shared
  text pte is changed. For example, pageout( ) changes its
  valid bit to invalid. Since other processes sharing this
  text page may have this text page in the cache, we flush
  out this page for all sharing processes. }
- p) We call vac_flush( ) from vrelpt( ) of vm_pt.c to flush
  the pte's of the outgoing process.
  { In vrelpt( ), the pages that contains pte's are released
  but mapout( ) is not called. }
- q) We call vac_pageflush( ) from wlok_unlock of
  sunwindowdev/winlock.c.
  { In wlok_unlock( ), mapping from wlock→lok_user

APPENDIX A-continued

Kernel Design Document for Virtual Address Cache to the physical u page of the current process becomes
invalid if wlock→ lok_user is nonzero. }
- r) We call vac_pageflush( ) from wlok_done( ) of
  sunwindowdev/winlock.c.
  { In wlok_done( ), the mapping from wlock→lok_user
  to the physical u page becomes invalid. }

16) When protection bits are changed and the affected portion
of the cache should be flushed. Such places are:
    a) in chgprot( ) of vm_machdep.c, we change the protection
       of text pages. We call vac_pageflush( ) there to avoid
       having any entry in the cache with different protection
       with the MMU.
    b) in settproc( ) of vm_machdep.c we change the protection
       bits of text pages. We call vac_flush( ) to flush
       the text part of the process. (settprot( ) is called
       from vm_text.c.)
    c) in vac_disable_kpage( ) of vm_machdep.c we call
       vac_pageflush( ) to flush all cache lines of this page
       before making the page non-cached.

V. Why don't we flush the cache here?

The following is a list of places where the mapping from
virtual addresses to physical addresses are changed but the cache
is not flushed. We describe the reasons why cache flushings
are not necessary.

1) In ctxpass( ) of vm_machdep.c, the virtual to physical
   mapping of proc p is changed to that of proc q. But, q
   gets whatever in the cache previous belong to p, so no
   need to flush cache for p.
   { ctxpass( ) is called by vpasspt( ) to pass the context of p
   to q. vpasspt( ) is called by vpassvm( ) which is called before
   and after vfork( ). vpassvm( ) passes the vm resources and
   the MMU context of p to q. When vpassvm( ) returns, the
   virtual to physical mapping for the context is not changed.
   Since the context is also passed, the affected mappings in
   the cache are still correct, except that now they belong to
   proc q instead of proc p. Therefore, there is no need to
   flush the cache either in ctxpass( ) or in vpassvm( ). }
2) In vpasspt( ), the virtual-to-physical mappings of processes
   "up" and "uq" are not changed when vpasspt( ) returns.
   (Or more precisely, the mappings are changed back to
   the same as the mappings when vpasspt( ) is entered).
3) In swap( ) of vm_swp.c, if "flag" indicates a dirty page
   push, the mapping of addr to physical address is replaced
   by that of the i-th page of proc[2]. Since dirty pages
   have been flushed in pageout( ), there is no need to flush
   "addr" again in swap( ).
4) In pmegload( ) of vm_machdep.c, when *pmxp (ctx_pmeg[seg])
   is zero and !need, we invalidate pmeg[seg]. Since we did
   either a context flush (in ctxfree( )) or a segment flush
   (in pmegrelease( )) when we set ctx_pmeg[seg] to zero,
   there is no need to do a segment flush here.
   { There are only two places where we set (struct context *)→
   ctx_pmeg[seg] to zero. One is in pmegrelease( ) where we
   vac_segflush(seg) and setsegmap(seg, SEGINV).
   The other place is in ctxfree( ) where we call vac_ctxflush( )
   but don't setsegmap(seg, SEGINV).
   Hence (struct context *)→ctx_pmeg[seg] is zero but MMU
   segmap is not SEGINV in this case. The reason that
   when *pmxp == 0 and !need in pmegload( ) needs a
   setsegmap(seg, SEGINV) is to make MMU segmap to be SEGINV.
   Since we have done a vac_ctxflush( ) in ctxfree( ), this
   segment should not have any left-over in the cache. }
5) In ctxalloc( ) of vm_machdep.c, setsegmap( ) is called
   to invalidate all mappings from the segment map. Since
   ctxfree( ) is called earlier to flush the entire
   context, no lines associated with these segments
   are in the cache. Therefore, segment flushes are not
   needed.
6) In ptesync( ) of vm_machdep.c, ptesync( ) calls pmegunload( )
   which or's the mod bits to pte's and reset the mod bits of
   the pmeg. When we check if another page in this pmeg is dirty,
   we check its pte which remembers the mod bit was on.
   We don't need to flush the segment because pmegunload turns
   off the mod bits in this pmeg.
7) unloadpgmap( ) of map.s saves the referenced and modified
   bits from MMU pme to soft pte and clears these bits in the

APPENDIX A-continued

Kernel Design Document for Virtual Address Cache pme. Since when we do pageout or swapout, it is the soft pte that we check to decide if a page is dirty, there is no need to flush the cache when the referenced and modified bits of a pme is changed.

8) In pmegunload( ) of vm_machdep.c, we call setsegmap(CSEG, pmp-pmeg), unloadpgmap(v, pte, num), and setsegmap(CSEG, SEGINV). In unloadpgmap( ), segment map of CSEG is used to access the pme's in this segment. Virtual address of segment CSEG is not accessed, thus segment CSEG doesn't have anything in the cache. Therefore, there is no need to call vac_segflush(CSEG) before we invalidate this segment.

9) In mapout( ) of vm_machdep.c, when we invalidate a segment by calling setsegmap((u_int)ptos(btop(vaddr)), (u_char)SEGINV), we have done pageflushes on all previously used pages in this segment. Therefore, there is no need to do a segment flush.

What is claimed is:

1. A computer system with cache flushing comprising:

a central processing unit operating in accordance with a shared, multi-user operating system having multiple concurrently active contexts and a kernel;

main memory;

a memory management unit, coupled to said processor and said main memory, for translating an address in virtual space into a corresponding address in physical space;

a virtual cache data array, coupled to said central processing unit, for storing a first plurality of blocks of data;

a virtual cache tag array, coupled to said virtual cache data array and said central processing unit, for storing a plurality of tag array elements wherein, each tag array element corresponds to a particular block of data stored in said virtual cache data array and further includes: a validity bit, a modification bit, a protection bit, a write allowed bit, a plurality of virtual address field bits, and a plurality of context bits;

cache hit logic means, coupled to said processor and said virtual cache tag array, for determining whether accesses from said central processing unit result in a cache hit or a cache miss;

cache flush logic means, coupled to said central processing unit and said cache hit logic means, for directing the flushing of said virtual cache data array;

wherein said central processing unit includes means, disposed within the kernel of said shared, multi-user operating system, for coupling a context match flush command comprising a plurality of context identifier bits, to said cache flush logic means and said virtual cache tag array, such that in response to said context match flush command, said cache flush logic means flushes a first block of data from said virtual cache data array in the event that:

the protection bit in the tag array element corresponding to said first block of data is in a first predesignated state; and, the plurality of context bits in the tag array element corresponding to said first block of data match said plurality of context identifier bits.

2. The computer system as provided in claim 1, wherein said central processing unit includes means, disposed within the kernel of said shared, multi-user operating system, for coupling a page match flush command, comprising a plurality of virtual page address bits, to said cache flush logic means and said virtual cache tag array, such that in response to said page match flush command, said cache flush logic means flushes a second block of data from said virtual cache data array in the event that:

the protection bit in the tag array element corresponding to said second block of data is in a second predesignated state; and, the plurality of virtual address field bits in the tag array element corresponding to said second block of data match said plurality of virtual page address bits wherein said page match flush command flushes a plurality of references to a predesignated virtual page from said virtual cache data array;

further wherein, the disposal of said means for coupling a page match flush command in said kernel of said shared, multi-user operating system supports the use of said virtual cache data array as a write-back cache transparent to multi-user application programs.

3. The computer system as provided in claim 1, wherein said central processing unit includes means, disposed within the kernel of said shared, multi-user operating system, for coupling a segment match flush command, comprising a plurality of segment address bits, to said cache flush logic means and said virtual cache tag array, such that in response to said segment match flush command, said cache flush logic means flushes a third block of data from said virtual cache data array in the event that:

the protection bit in the tag array element corresponding to said third block of data is in a second predesignated state; and, the plurality of virtual address field bits in the tag array element corresponding to said third block of data match the plurality of segment address bits;

wherein said segment flush command flushes a plurality of references to a predesignated segment from the said virtual cache data array;

further wherein, the disposal of said means for coupling a segment match flush command in said kernel of said shared, multi-user operating system supports the use of said virtual cache data array as a write-back cache transparent to multi-user application programs.

4. The computer system as provided in claim 1, wherein said central processing unit includes means, disposed within the kernel of said shared, multi-user operating system, for generating an access directed to a particular block of data, said access including a plurality of access virtual address bits, and further wherein, said cache hit logic means determines that a cache hit has occurred for said access in the event that:

the valid bit in the tag array element corresponding to said particular block of data is in a predesignated state; and, the plurality of virtual address field bits in the tag array element corresponding to said particular block of data match the plurality of access virtual address bits; and the protection bit in the tag array element corresponding to said particular data block is in a second predesignated state;

wherein protection checking is applied directly to said virtual cache data array.

5. The computer system as provided in claim 1, further comprising:

a context identification register coupled to said processor and said cache hit logic means for storing a plurality of context identification bits;

wherein said central processing unit includes means, disposed within the kernel of said shared, multi-user operating system, for coupling a page match flush command, comprising a plurality of virtual page address bits, to said cache flush logic means and said virtual cache tag array, such that in response to said page match flush command, said cache flush logic means flushes a second block of data from said virtual cache data array in the event that:

the plurality of context bits in the tag array element corresponding to said second block of data match said plurality of context identification bits; and, the plurality of virtual address field bits in the tag array element corresponding to said second block of data match said plurality of virtual page address bits.

6. The computer system as provided in claim 1, further comprising:

a context identification register coupled to said processor and said cache hit logic means for storing a plurality of context identification bits;

wherein said central processing unit includes means, disposed within the kernel of said shared, multi-user operating system, for coupling a segment match flush command, comprising a plurality of segment address bits, to said cache flush logic means and said virtual cache tag array, such that in response to said segment match flush command, said cache flush logic means flushes a third block of data from said virtual cache data array in the event that:

the plurality of context bits in the tag array element corresponding to said third block of data match said plurality of context identification bits; and, the plurality of virtual address field bits in the tag array element corresponding to said third block of data match the plurality of segment address bits.

7. In a computer system with cache flushing comprising a central processing unit operating in accordance with a shared, multi-user operating system having multiple concurrently active contexts and a kernel; a main memory; a memory management unit, coupled to said processor and said main memory, for translating an address in virtual space into a corresponding address in physical space; a virtual cache data array, coupled to said central processing unit, for storing a first plurality of blocks of data; a virtual cache tag array, coupled to said virtual cache data array and said central processing unit, for storing a plurality of tag array elements wherein, each tag array element corresponds to a particular block of data stored in said virtual address cache data array and further includes: a validity bit, a modification bit, a protection bit, a write allowed bit, a plurality of virtual address field bits, and a plurality of context bits; cache hit logic means, coupled to said processor and said virtual cache tag array, for determining whether accesses from said central processing unit results in a cache hit or a cache miss; cache flush logic means, coupled to said central processing unit and said cache hit logic means, for directing the flushing of said virtual address cache data array; a method for selectively flushing said virtual cache data array comprising the steps of:

said central processing unit coupling a context match flush command defined by said kernel of said shared, multi-user operating system, comprising a plurality of context identifier bits, to said cache flush logic means and said virtual cache tag array;

responsive to said context match flush command, said cache flush logic means flushing a first block of data from said virtual cache data array in the event that:

the protection bit in the tag array element corresponding to said first block of data is in a first predesignated state; and the plurality of context bits in the tag array element corresponding to said first block of data match said plurality of context identifier bits.

8. The method for selectively flushing said virtual cache data array as provided in claim 7, further comprising the steps of:

said central processing unit coupling a page match flush command defined by said kernel of said shared, multi-user operating system, comprising a plurality of virtual page address bits, to said cache flush logic means and said virtual cache tag array;

responsive to said page match flush command, said cache flush logic means flushing a second block of data from said virtual cache data array in the event that:

the protection bit in the tag array element corresponding to said second block of data is in a second predesignated state; and, the plurality of virtual address field bits in the tag array element corresponding to said second block of data match said plurality of virtual page address bits;

wherein said page match flush command flushes a plurality of references to a predesignated virtual page from said virtual cache data array;

further wherein, the definition of said page match flush command in said kernel of said shared, multi-user operating system supports the use of said virtual cache data array as a write-back cache transparent to multi-user application programs.

9. The method for selectively flushing said virtual cache data array as provided in claim 7, further comprising the steps of:

said central processing unit coupling a segment match flush command defined by said kernel of said shared, multi-user operating system, comprising a plurality of segment address bits, to said cache flush logic means and said virtual cache tag array, responsive to said segment match flush command, said cache flush logic means flushing a third data block of data from said virtual cache data array in the event that:

the protection bit in the tag array element corresponding to said third block of data is in a second predesignated state; and, the plurality of virtual address field bits in the tag array element corresponding to said third block of data match the plurality of segment address bits;

wherein said segment flush command flushes a plurality of references to a predesignated segment from the said virtual cache data array;

further wherein, the definition of said segment match flush command in said kernel of said shared, multi-user operating system supports the use of said virtual cache data array as a write-back cache transparent to multi-user application programs.

10. The method as provided in claim 7, wherein said computer system further comprises a context identification register coupled to said processor and said cache hit logic means for storing a plurality of context identification bits, and said method for selectively flushing said virtual cache data array further comprises the steps of:

said central processing unit coupling a page match flush command defined by said kernel of said shared, multi-user operating system comprising a plurality of virtual page address bits, to said cache flush logic means and said virtual cache tag array;

responsive to said page match flush command, said cache flush logic means flushing a second block of data from said virtual cache data array in the event that:

the plurality of context bits in the tag array element corresponding to said second block of data match said plurality of context identification bits; and, the plurality of virtual address field bits in the tag array element corresponding to said second block of data match said plurality of virtual page address bits;

wherein said page match flush command flushes a plurality of references to a predesignated virtual page from said virtual cache data array;

further wherein, the definition of said page match flush command in said kernel of said shared, multi-user operating system supports the use of said virtual cache data array as a write-back cache transparent to multi-user application programs.

11. The method as provided in claim 7, wherein said computer system further comprises a context identification register coupled to said processor and said cache hit logic means for storing a plurality of context identification bits, and said method for selectively flushing said virtual cache data array further comprises the steps of:

said central processing unit includes coupling a segment match flush command defined by said kernel of said shared, multi-user operating system, comprising a plurality of segment address bits, to said cache flush logic means and said virtual cache tag array;

responsive to said segment match flush command, said cache flush logic means flushing a third data block of data from said virtual cache data array in the event that:

the plurality of context bits in the tag array element corresponding to said third block of data match said plurality of context identification bits; and, the plurality of virtual address field bits in the tag array element corresponding to said third block of data match the plurality of segment address bits;

wherein said segment flush command flushes a plurality of references to a predesignated segment from the said virtual cache data array;

further wherein, the definition of said segment match flush command in said kernel of said shared, multi-user operating system supports the use of said virtual cache data array as a write-back cache transparent to multi-user application programs.

* * * * *